US010965239B2

(12) United States Patent
Mori et al.

(10) Patent No.: US 10,965,239 B2
(45) Date of Patent: Mar. 30, 2021

(54) POWER CONVERSION DEVICE AND ELECTRIC POWER STEERING DEVICE

(71) Applicant: Mitsubishi Electric Corporation, Tokyo (JP)

(72) Inventors: Tatsuya Mori, Tokyo (JP); Akira Furukawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/614,513

(22) PCT Filed: Jul. 3, 2017

(86) PCT No.: PCT/JP2017/024353
§ 371 (c)(1),
(2) Date: Nov. 18, 2019

(87) PCT Pub. No.: WO2019/008637
PCT Pub. Date: Jan. 10, 2019

(65) Prior Publication Data
US 2020/0220488 A1 Jul. 9, 2020

(51) Int. Cl.
*H02P 27/08* (2006.01)
*H02M 7/5387* (2007.01)
(Continued)

(52) U.S. Cl.
CPC .............. *H02P 27/08* (2013.01); *B62D 5/046* (2013.01); *H02M 7/53871* (2013.01); *H02P 25/22* (2013.01)

(58) Field of Classification Search
CPC .. H02P 27/08; H02P 25/22; H02P 1/00; H02P 1/04; H02P 1/46; H02P 1/12;
(Continued)

(56) References Cited

U.S. PATENT DOCUMENTS

| 2016/0043670 A1* | 2/2016 | Nakamura | H02P 29/032 318/400.17 |
| 2016/0248349 A1* | 8/2016 | Kano | H02P 25/22 |
| 2018/0006547 A1 | 1/2018 | Mori et al. | |

FOREIGN PATENT DOCUMENTS

| JP | 5045799 B2 | 10/2012 |
| JP | 5644854 B2 | 12/2014 |
| WO | 2016/132426 A1 | 8/2016 |

OTHER PUBLICATIONS

Extended European Search Report dated May 25, 2020, from the European Patent Office in Application No. 17916934.7.
(Continued)

*Primary Examiner* — Antony M Paul
(74) *Attorney, Agent, or Firm* — Sughrue Mion, PLLC; Richard C. Turner

(57) ABSTRACT

A power conversion device including: a first and second multi-phase inverters (MPI1,MPI2) to receive a DC voltage (Vdc) and convert into AC voltages (Vacs), when fc represents a frequency of a PWM signal output from each of the MPI1 and the MPI2, fr represents a lower limit frequency defined by noise regulation of the power conversion device, an absolute value of a differential voltage being a difference between: a first average voltage, which is an average value of first voltage commands of respective phases as command values for the Vacs of MPI1; and a second average voltage, which is an average value of second voltage commands of respective phases as command values for the Vacs of MPI2, is set equal to or less than k2·fc/fr·Vdc [V] (k2 is an odd number equal to or more than one), to reduce noise in a frequency band defined by noise regulation.

10 Claims, 14 Drawing Sheets

(51) Int. Cl.
*H02P 25/22* (2006.01)
*B62D 5/04* (2006.01)

(58) Field of Classification Search
CPC .... H02P 1/22; H02P 1/465; H02P 3/00; H02P 3/18; H02P 3/22; H02P 21/00; H02P 6/00; H02P 6/10; H02P 6/188; H02P 6/32; H02P 23/00; H02P 27/00; H02P 27/06; B62D 5/046; H02M 7/5387
USPC ..... 318/400.01, 400.02, 700, 701, 721, 799, 318/800, 801, 727, 430, 432
See application file for complete search history.

(56) References Cited

OTHER PUBLICATIONS

International Search Report of PCT/JP2017/024353 dated Sep. 26, 2017.

\* cited by examiner

WAVEFORM OF Voffset1-Voffset2

WAVEFORM OF Voffset1-Voffset2

WAVEFORM OF Voffset1-Voffset2

ACTUAL MEASUREMENT OF NOISE (PEAK)

ACTUAL MEASUREMENT OF NOISE (AVERAGE)

WAVEFORM OF Voffset1-Voffset2

ACTUAL MEASUREMENT OF NOISE (PEAK)

ACTUAL MEASUREMENT OF NOISE (AVERAGE)

POWER CONVERSION DEVICE AND ELECTRIC POWER STEERING DEVICE

CROSS REFERENCE TO RELATED APPLICATIONS

This application is a National Stage of International Application No. PCT/JP2017/024353 filed Jul. 3, 2017.

TECHNICAL FIELD

The present invention relates to a power conversion device and an electric power steering apparatus.

BACKGROUND ART

Hitherto, there has been known a motor control apparatus configured as follows. That is, the motor control apparatus includes: a plurality of power converters; a plurality of motor command calculation units; and a plurality of carrier generation units, which are provided in association with a plurality of motors, respectively, in which the plurality of carrier generation units are each configured to generate a plurality of carrier signals, and a carrier frequency control unit is configured to control frequencies of the plurality of carrier signals so that the frequencies of the plurality of carrier signals fluctuate within a plurality of preset frequency ranges which are defined for each of the plurality of carrier signals. Further, the plurality of preset frequency ranges are determined in advance not to overlap one another, to thereby reduce noise generated by switching operations of the power converters (see Patent Literature 1).

Further, there has been known a power conversion device configured as follows. That is, the power conversion device includes two inverters, in which a "flatbed two-phase modulation" is executed in one inverter unit, to subtract from all voltage command signals of three phases a value obtained by subtracting a preset lower limit value from the smallest voltage command signal among the voltage command signals of the three phases so that the smallest voltage command signal equals the preset lower limit value, and a "flattop two-phase modulation process" is executed in another inverter unit, to subtract from all voltage command signals of three phases a value obtained by subtracting a preset upper limit value from the largest voltage command signal among the voltage command signals of the three phases so that the largest voltage command signal equals the preset upper limit value. With this configuration, effective voltage vector generation periods in the two inverters are not overlapped, and hence a ripple current of a capacitor can be reduced (see Patent Literature 2).

CITATION LIST

Patent Literature

[PTL 1] JP 5644854 B2 (paragraph 0012)
[PTL 2] JP 5045799 B2 (paragraph 0015)

SUMMARY OF INVENTION

Technical Problem

With the method described in Patent Literature 1, in which a plurality of frequencies are set as a frequency of a pulse width modulation (PWM) carrier wave for respective inverters, and one of the frequencies is changed to be selected, it is required to store a plurality of PWM carrier waves and thus prepare a large memory capacity. Consequently, a control apparatus cannot be easily mounted to an inexpensive microcontroller (CPU).

Further, when a PWM carrier wave for each inverter is to be changed after the control apparatus is mounted to a CPU such as a microcontroller, this operation requires a large amount of time. Therefore, for example, when it is detected that a noise level of a certain frequency component exceeds a reference value by measuring noise in an end product and an additional operation of reducing noise is required, the noise level is required to be adjusted by further setting one or two more PWM carrier waves of different frequencies. In this case, a large amount of time is required to design and install an additional program to the microcontroller, possibly leading to shortage of the memory of the microcontroller.

Further, with the method described in Patent Literature 2, in which the "flatbed two-phase modulation process" is executed in one inverter, and the "flattop two-phase modulation process" is executed in another inverter, the voltage command signal in the one inverter is shifted to be as high as possible, and the voltage command signal in the another inverter is shifted to be as low as possible so as to avoid overlap of effective vectors. This method is effective to reduce a capacitor current within a wide range of modulation ratios, but is not directed to reducing noise generated by the two inverters and thus is not suitable for noise reduction.

The present invention has been made to solve the above-mentioned problems, and an object of the present invention is generally to provide an electric power steering apparatus and a power conversion device including two multi-phase inverters, which can suppress noise within a frequency band defined by noise regulation without changing a frequency of a PWM carrier wave of each inverter.

Solution to Problem

According to one embodiment of the present invention, there are provided a power conversion device and the like including: a first multi-phase inverter and a second multi-phase inverter, which are configured to receive a DC voltage output from a DC power supply, and execute power conversion to convert the DC voltage into AC voltages and then output the resultant AC voltages; a drive voltage command calculation unit configured to calculate first multi-phase drive voltage commands and second multi-phase drive voltage commands, which cause the first multi-phase inverter and the second multi-phase inverter to drive a load based on an external control command; a first average voltage adjustment unit configured to output, as first multi-phase voltage commands, values obtained by adjusting the first multi-phase drive voltage commands with use of a first offset voltage, to thereby control the first multi-phase inverter; a second average voltage adjustment unit configured to output, as second multi-phase voltage commands, values obtained by adjusting the second multi-phase drive voltage commands with use of a second offset voltage, to thereby control the second multi-phase inverter; and a voltage adjustment control unit configured to, when the DC voltage of the DC power supply is represented by Vdc, a frequency of a PWM signal of each of the first multi-phase inverter and the second multi-phase inverter is represented by fc, and a lower limit frequency defined by noise regulation to which the power conversion device is required to conform is represented by fr, control the first average voltage adjustment unit and the second average voltage adjustment unit so that an absolute value of a differential voltage being a difference between: a first average voltage, which is an average value of the first multi-phase voltage commands of respective phases as command values for the AC voltages to be output from the first multi-phase inverter; and a second average voltage, which is an average value of the second multi-phase voltage commands of respective phases as command values for the AC voltages to be output from the second multi-phase inverter, is equal to or less than a value derived from Expression (1):

$$k2 \cdot fc/fr \cdot Vdc[V] \tag{1}$$

where k2 represents an odd number equal to or more than one.

Advantageous Effects of Invention

According to the present invention, it is possible to provide the electric power steering apparatus and the power conversion device including two multi-phase inverters, which can suppress noise within a frequency band defined by noise regulation without changing a frequency of a PWM carrier wave of each inverter.

BRIEF DESCRIPTION OF DRAWINGS

FIG. 9A, FIG. 9B and FIG. 9C are graphs, in which FIG. 9B and FIG. 9C are graphs for showing an average point and a peak of actual measurement of noise, respectively, which are obtained when a first offset voltage and a second offset voltage have a difference as shown in FIG. 9A.

FIG. 10A, FIG. 10B and FIG. 10O are graphs, in which FIG. 10B and FIG. 10O are graphs for showing an average point and a peak of actual measurement of noise, respectively, which are obtained when the first offset voltage and the second offset voltage have a difference as shown in FIG. 10A.

FIG. 11A, FIG. 11B and FIG. 11C are graphs, in which FIG. 11B and FIG. 11C are graphs for showing an average point and a peak of actual measurement of noise, respectively, which are obtained when the first offset voltage and the second offset voltage have a difference as shown in FIG. 11A.

FIG. 12A, FIG. 12B and FIG. 12C are graphs, in which FIG. 12B and FIG. 12C are graphs for showing an average point and a peak of actual measurement of noise, respectively, which are obtained when the first offset voltage and the second offset voltage have a difference as shown in FIG. 12A, in the first embodiment of the present invention.

DESCRIPTION OF EMBODIMENTS

According to one embodiment of the present invention, an absolute value (Vave_dif_abs) of a differential voltage (Vave_dif) being a difference between a first average voltage (Vave1) and a second average voltage (Vave2) is set equal to or less than a value derived from Expression (1), the first average voltage (Vave1) being an average value of first voltage commands (Vu1_ref, Vv1_ref, and Vw1_ref) of respective phases and the second average voltage (Vave2) being an average value of second voltage commands (Vu2_ref, Vv2_ref, and Vw2_ref) of respective phases, the first and second voltage commands being command values for AC voltages to be output from a first multi-phase inverter and a second multi-phase inverter of a power conversion device, respectively:

$$k2 \cdot fc/fr \cdot Vdc[V] \tag{1}$$

where

Vdc represents a DC voltage for the power conversion device, which is supplied from a DC power supply.

fc represents a frequency of each PWM signal (Vu1, Vv1, and Vw1) output from the first multi-phase inverter and the second multi-phase inverter, fr represents a lower frequency limit defined by noise regulation to which the power conversion device is required to conform, k2 represents an odd number equal to or more than one.

Specifically, with the configuration in which the absolute value of the differential voltage being a difference between the first average voltage and the second average voltage is set equal to or less than a value derived from Expression (1) above, noise of a frequency component equal to or more than the lower frequency limit fr defined by the noise regulation, can be reduced without changing the frequency fc of the PWM signal. With this configuration, a capacity of a memory of a CPU such as a microcontroller can be considerably saved, the device can be mounted to an inexpensive microcontroller (CPU) having a small memory capacity, and consequently, cost reduction is achieved.

Now, a power conversion device and an electric power steering apparatus according to the present invention is described with reference to the drawings by way of embodiments. In the embodiments, the same or corresponding parts are denoted by the same symbols, and redundant description is omitted.

First Embodiment

Figure 1:
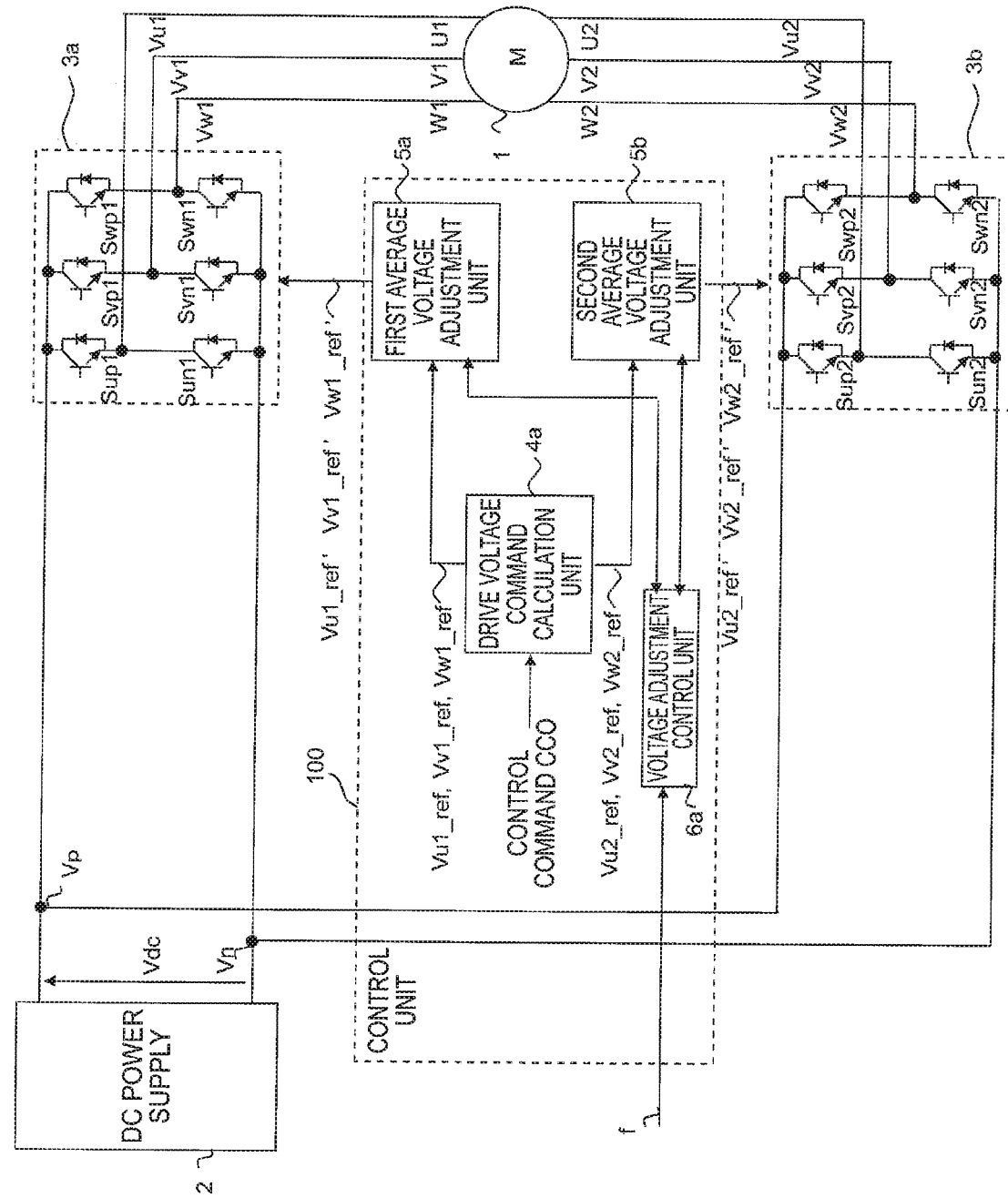
FIG. 1 is a diagram for illustrating an overall configuration of a power conversion device according to a first embodiment of the present invention.

FIG. 1 is a diagram for illustrating an overall configuration of a power conversion device according to a first embodiment of the present invention.

Figure 2A:
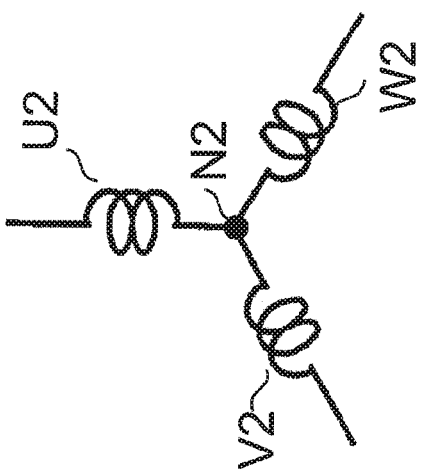
FIG. 2A and FIG. 2B are views for illustrating a configuration example of windings of an AC rotating machine in the power conversion device according to the present invention.
Figure 2B:
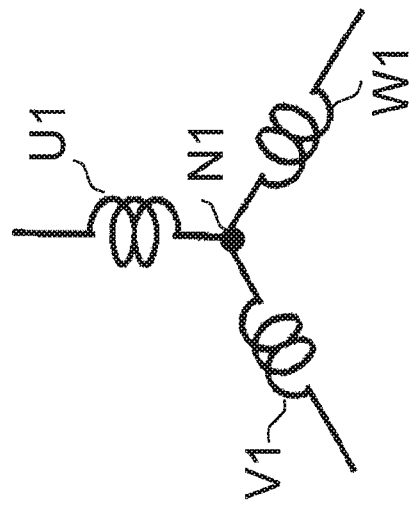

An AC rotating machine 1 includes two sets of three-phase windings, that is, first three-phase windings U1, V1, and W1, and second three-phase windings U2, V2, and W2. As illustrated in FIG. 2A and FIG. 2B, in the AC rotating machine 1, the first three-phase windings U1-V1-W1 of FIG. 2A and the second three-phase windings U2-V2-W2 of FIG. 2B are arranged in phase in terms of an electric angle, and neutral points N1 and N2 thereof are not electrically connected.

A DC power supply 2 is configured to output a DC voltage Vdc to a first three-phase inverter 3a and a second three-phase inverter 3b. The DC power supply 2 includes all devices that can output a DC voltage, such as a battery, a DC-DC converter, a diode rectifier, or a PWM rectifier. The DC power supply 2 has a positive-side potential Vp and a negative-side potential Vn.

The first three-phase inverter 3a is configured to execute PWM modulation through comparison with a PWM carrier wave having a frequency fc based on first three-phase voltage commands Vu1_ref', Vv1_ref', and Vw1_ref' as described later, so as to perform inverse conversion, that is, DC-AC conversion of the DC voltage Vdc received from the DC power supply 2, to thereby apply resultant AC voltages Vu1, Vv1, and Vw1 to the first three-phase windings U1, V1, and W1 of the AC rotating machine 1. Switches Sup1 to Swp1, and switches Sun1 to Swn1 are prepared by connecting, in inverse parallel, diodes and semiconductor switches that are any ones of IGBTs, bipolar transistors, MOS power transistors, and the like.

The second three-phase inverter 3b is configured to execute PWM modulation through comparison with a PWM carrier wave having a frequency fc based on second three-phase voltage commands Vu2_ref', Vv2_ref', and Vw2_ref' as described later, so as to perform inverse conversion, that is, DC-AC conversion of the DC voltage Vdc received from the DC power supply 2, to thereby apply resultant AC voltages Vu2, Vv2, and Vw2 to the second three-phase windings U2, V2, and W2 of the AC rotating machine 1. Switches Sup2 to Swp2, and switches Sun2 to Swn2 are prepared by connecting, in inverse parallel, diodes and semiconductor switches that are any ones of IGBTs, bipolar transistors, MOS power transistors, and the like.

A drive voltage command calculation unit 4a is configured to calculate first three-phase drive voltage commands Vu1_ref, Vv1_ref, and Vw1_ref and second three-phase drive voltage commands Vu2_ref, Vv2_ref, and Vw2_ref used to drive the AC rotating machine 1 in accordance with a control command CCO.

The first three-phase drive voltage commands Vu1_ref, Vv1_ref, and Vw1_ref and the second three-phase drive voltage commands Vu2_ref, Vv2_ref, and Vw2_ref are calculated based on publicly-known technologies as described below.

One example is V/F control executed to determine amplitudes of the first three-phase drive voltage commands and the second three-phase drive voltage commands under a state in which a speed command or a frequency command f for the AC rotating machine 1 is set as the control command CCO of FIG. 1.

Another example is current feedback control, in which a current command for the AC rotating machine 1 is set as the control command CCO, and the first three-phase drive voltage commands Vu1_ref, Vv1_ref, and Vw1_ref are calculated through proportional-integral control so as to reduce to zero a deviation between the current command and values of currents flowing through the first three-phase windings U1, V1, and W1, and the second three-phase drive voltage commands Vu2_ref, Vv2_ref, and Vw2_ref are calculated through proportional-integral control so as to reduce to zero a deviation between the current command and values of currents flowing through the second three-phase windings U2, V2, and W2.

A first average voltage adjustment unit 5a is configured to uniformly add a first offset voltage Voffset1 to the first three-phase drive voltage commands Vu1_ref, Vv1_ref, and Vw1_ref output from the drive voltage command calculation unit 4a, and then output the resultant commands as the first three-phase voltage commands Vu1_ref', Vv1_ref', and Vw1_ref'.

<Adjustment of First Average Voltage Vave1>

A first average voltage Vave1 as an average voltage of the first three-phase voltage commands Vu1_ref', Vv1_ref', and Vw1_ref' can be adjusted through adjustment of the first offset voltage Voffset1. This adjustment is described below.

The first three-phase drive voltage commands Vu1_ref, Vv1_ref, and Vw1_ref can be derived from Expressions (1-1) to (1-3) as three-phase AC voltages. In Expressions (1-1) to (1-3), Vamp1 represents an amplitude of the respective first three-phase drive voltage commands, and θv1 represents a phase of the respective first three-phase drive voltage commands.

$$Vu1\_ref = Vamp1 \cdot \sin(\theta v1) \tag{1-1}$$

$$Vv1\_ref = Vamp1 \cdot \sin(\theta v1 - 2\pi/3) \tag{1-2}$$

$$Vw1\_ref = Vamp1 \cdot \sin(\theta v1 + 2\pi/3) \tag{1-3}$$

Next, the first three-phase voltage commands Vu1_ref', Vv1_ref', and Vw1_ref' are obtained by adding the first offset voltage Voffset1 to the first three-phase drive voltage commands Vu1_ref, Vv1_ref, and Vw1_ref, and thus those commands are represented by Expressions (1-4) to (1-6).

$$Vu1\_ref' = Vu1\_ref + Voffset1 = Vamp1 \cdot \sin(\theta v1) + Voffset1 \tag{1-4}$$

$$Vv1\_ref' = Vv1\_ref + Voffset1 = Vamp1 \cdot \sin(\theta v1 - 2\pi/3) + Voffset1 \tag{1-5}$$

$$Vw1\_ref' = Vw1\_ref + Voffset1 = Vamp1 \cdot \sin(\theta v1 + 2\pi/3) + Voffset1 \tag{1-6}$$

The first average voltage Vave1 is represented by Expression (1-7).

$$Vave1 = (Vu1\_ref' + Vv1\_ref' + Vw1\_ref')/3 = Voffset1 \tag{1-7}$$

As described above, the first average voltage Vave1 equals the first offset voltage Voffset1, and thus the first average voltage Vave1 can be adjusted through the adjustment of the first offset voltage Voffset1.

A second average voltage adjustment unit 5b is configured to uniformly add a second offset voltage Voffset2 to the second three-phase drive voltage commands Vu2_ref, Vv2_ref, and Vw2_ref output from the drive voltage command calculation unit 4a, and then output the resultant commands as the second three-phase voltage commands Vu2_ref', Vv2_ref', and Vw2_ref'.

<Adjustment of Second Average Voltage Vave2>

A second average voltage Vave2 as an average voltage of the second three-phase voltage commands Vu2_ref', Vv2_ref', and Vw2_ref' can be adjusted through adjustment of the second offset voltage Voffset2. This adjustment is described below.

The second three-phase drive voltage commands Vu2_ref, Vv2_ref, and Vw2_ref can be derived from Expressions (1-8) to (1-10) as three-phase AC voltages. In Expressions (1-8) to (1-10), Vamp2 represents an amplitude of the respective second three-phase drive voltage commands, and θv2 represents a phase of the respective second three-phase drive voltage commands.

$$Vu2\_ref = Vamp2 \cdot \sin(\theta v2) \quad (1\text{-}8)$$

$$Vv2\_ref = Vamp2 \cdot \sin(\theta v2 - 2\pi/3) \quad (1\text{-}9)$$

$$Vw2\_ref = Vamp2 \cdot \sin(\theta v2 + 2\pi/3) \quad (1\text{-}10)$$

Next, the second three-phase voltage commands Vu2_ref', Vv2_ref', and Vw2_ref' are obtained by adding the second offset voltage Voffset2 to the second three-phase drive voltage commands Vu2_ref, Vv2_ref, and Vw2_ref, and thus those commands are represented by Expressions (1-11) to (1-13).

$$Vu2\_ref' = Vu2\_ref + Voffset2 = Vamp2 \cdot \sin(\theta v2) + Voffset2 \quad (1\text{-}11)$$

$$Vv2\_ref' = Vv2\_ref + Voffset2 = Vamp2 \cdot \sin(\theta v2 - 2\pi/3) + Voffset2 \quad (1\text{-}12)$$

$$Vw2\_ref' = Vw2\_ref + Voffset2 = Vamp2 \cdot \sin(\theta v2 + 2\pi/3) + Voffset2 \quad (1\text{-}13)$$

The second average voltage Vave2 is represented by Expression (1-14).

$$Vave2 = (Vu2\_ref' + Vv2\_ref' + Vw2\_ref')/3 = Voffset2 \quad (1\text{-}14)$$

As described above, the second average voltage Vave2 equals the second offset voltage Voffset2, and thus the second average voltage Vave2 can be adjusted through the adjustment of the second offset voltage Voffset2.

<Generation of AC voltages Vu1, Vv1, and Vw1>

Figure 3:
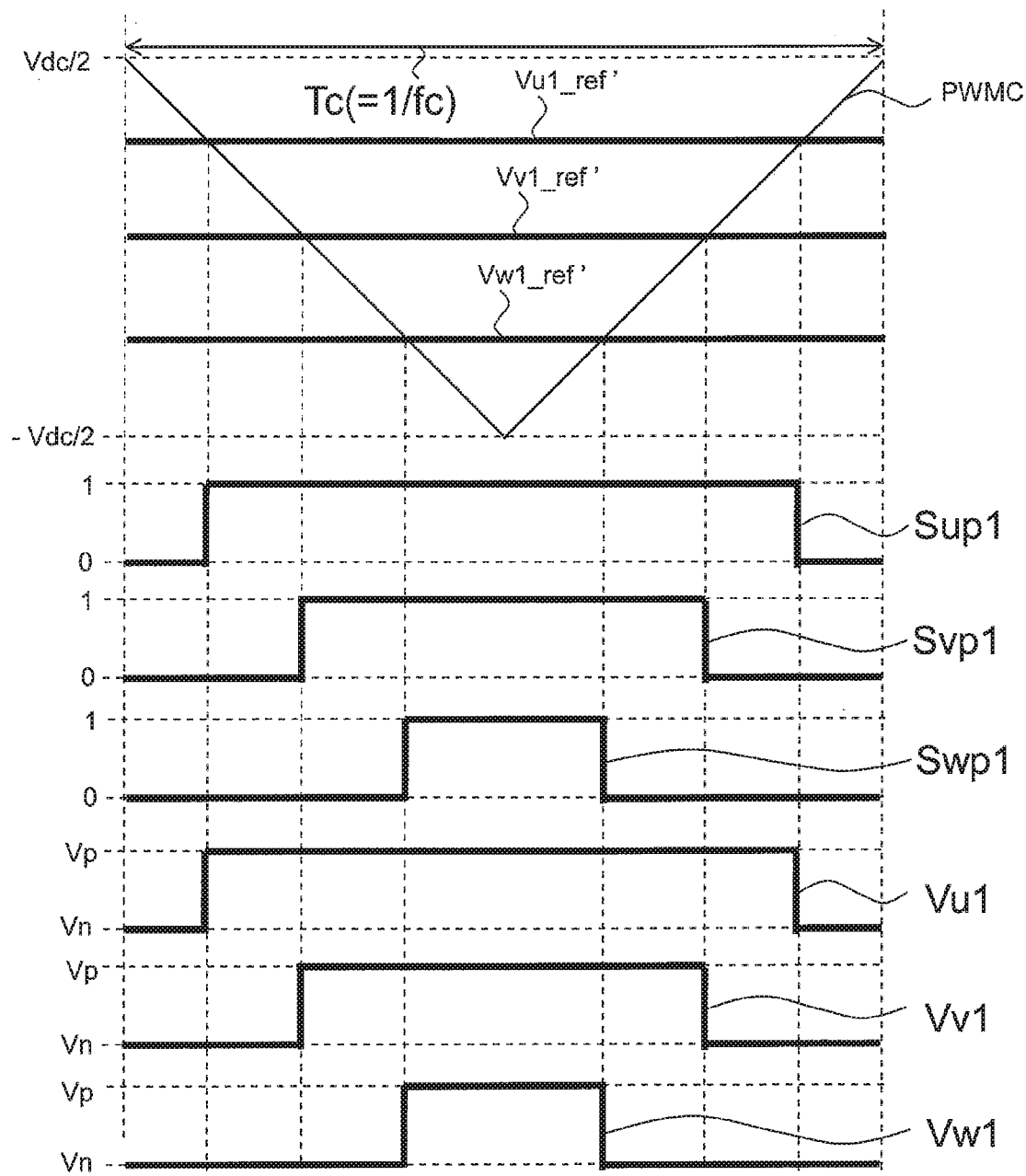
FIG. 3 is a chart for showing an operation of a first three-phase inverter of the power conversion device according to the first embodiment of the present invention.

Next, a description is given of how to generate the AC voltages Vu1, Vv1, and Vw1 by the first three-phase inverter 3a based on the first three-phase voltage commands Vu1_ref, Vv1_ref, and Vw1_ref as command values for the AC voltages Vu1, Vv1, and Vw1 to be output from the first three-phase inverter 3a. FIG. 3 is a chart for showing how to generate the AC voltages Vu1, Vv1, and Vw1 in the first embodiment of the present invention.

In FIG. 3, operations of the switches Sup1, Svp1, and Swp1 on the positive side of the first three-phase inverter 3a are illustrated, and operations of the switches Sun1, Svn1, and Swn1, which operate inversely to the operations of the switches on the positive side, are not illustrated.

The first three-phase voltage command Vu1_ref' is compared to a PWM carrier wave PWMC with a cycle Tc (=1/fc), and when Vu1_ref' is larger than PWMC, the switch Sup1 is set to "1" (ON), and the switch Sun1, which is not illustrated in FIG. 3, is set to "0" (OFF). With this setting, the positive-side potential Vp of the DC power supply 2 is output as the AC voltage Vu1.

In contrast, when Vu1_ref' is smaller than PWMC, the switch Sup1 is set to "0" (OFF), and the switch Sun1 is set to "1" (ON). With this setting, the negative-side potential Vn of the DC power supply 2 is output as the AC voltage Vu1.

In the above-mentioned comparison between the respective phase voltage commands and the PWMC, the case in which the respective phase voltage commands are "larger" or "smaller" than the PWMC is described, but the case in which the respective phase voltage commands are equal to the PWMC is not described. This is because in actuality, opening/closing operations of the switches of the respective three-phase inverters are controlled with use of a buffer so that series-connected switches are not turned on or off at the same time. A detailed description thereof is omitted here.

The first three-phase voltage command Vv1_ref' is compared to a PWM carrier wave PWMC with a cycle Tc (=1/fc), and when Vv1_ref' is larger than PWMC, the switch Svp1 is set to "1" (ON), and the switch Svn1, which is not illustrated in FIG. 3, is set to "0" (OFF). With this setting, the positive-side potential Vp of the DC power supply 2 is output as the AC voltage Vv1.

In contrast, when Vv1_ref' is smaller than PWMC, the switch Svp1 is set to "0" (OFF), and the switch Svn1 is set to "1" (ON). With this setting, the negative-side potential Vn of the DC power supply 2 is output as the AC voltage Vv1.

The first three-phase voltage command Vw1_ref' is compared to a PWM carrier wave PWMC with a cycle Tc (=1/fc), and when Vw1_ref' is larger than PWMC, the switch Swp1 is set to "1" (ON), and the switch Swn1, which is not illustrated in FIG. 3, is set to "0" (OFF). With this setting, the positive-side potential Vp of the DC power supply 2 is output as the AC voltage Vw1.

In contrast, when Vw1_ref' is smaller than PWMC, the switch Swp1 is set to "0" (OFF), and the switch Swn1 is set to "1" (ON), With this setting, the negative-side potential Vn of the DC power supply 2 is output as the AC voltage Vw1.

Through the operation above, the AC voltages Vu1, Vv1, and Vw1 output from the first three-phase inverter 3a are PWM voltages with the cycle Tc, that is, the frequency fc. The PWM voltage of the frequency fc is also referred to as "PWM signal", and the cycle thereof matches the cycle Tc (=1/fc) of the PWM carrier wave PWMC. Thus, the frequency thereof also matches the frequency fc of the PWM carrier wave PWMC.

<Generation of AC Voltages Vu2, Vv2, and Vw2>

Figure 4:
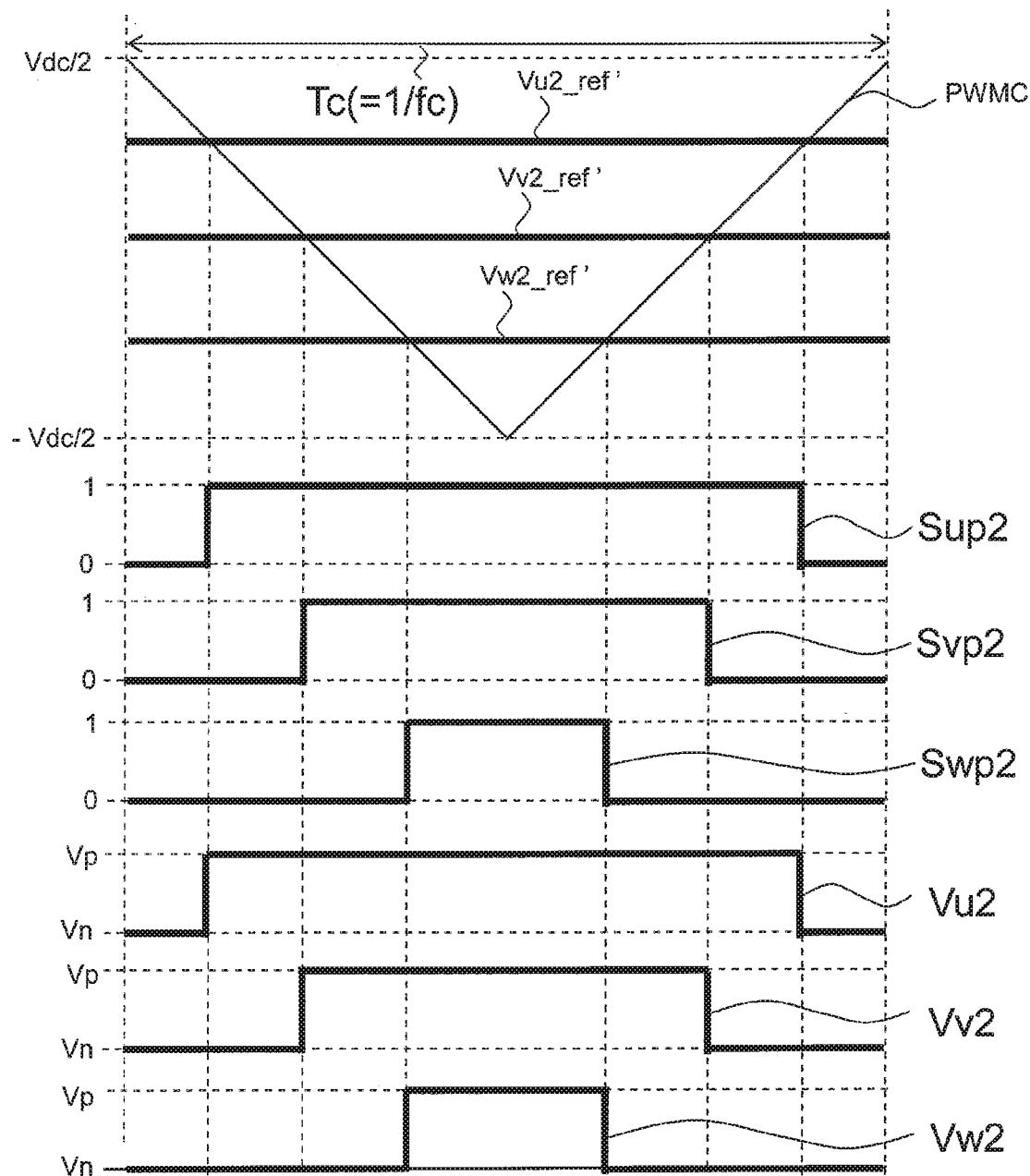
FIG. 4 is a chart for showing an operation of a second three-phase inverter of the power conversion device according to the first embodiment of the present invention.

Next, a description is given of how to generate the AC voltages Vu2, Vv2, and Vw2 by the second three-phase inverter 3b based on the second three-phase voltage commands Vu2_ref', Vv2_ref', and Vw2_ref' as command values for the AC voltages Vu2, Vv2, and Vw2 to be output from the second three-phase inverter 3b. FIG. 4 is a chart for showing how to generate the AC voltages Vu2, Vv2, and Vw2 in the first embodiment of the present invention.

In FIG. 4, operations of the switches Sup2, Svp2, and Swp2 on the positive side of the second three-phase inverter 3b are illustrated, and operations of the switches Sun2, Svn2, and Swn2, which operate inversely to the operations of the switches on the positive side, are not illustrated.

The second three-phase voltage command Vu2_ref' is compared to a PWM carrier wave PWMC with a cycle Tc (=1/fc), and when Vu2_ref' is larger than PWMC, the switch Sup2 is set to "1" (ON), and the switch Sun2, which is not illustrated in FIG. 4, is set to "0" (OFF). With this setting, the positive-side potential Vp of the DC power supply 2 is output as the AC voltage Vu2.

In contrast, when Vu2_ref' is smaller than PWMC, the switch Sup2 is set to "0" (OFF), and the switch Sun2 is set to "1" (ON). With this setting, the negative-side potential Vn of the DC power supply 2 is output as the AC voltage Vu2.

The second three-phase voltage command Vv2_ref' is compared to a PWM carrier wave PWMC with a cycle Tc (=1/fc), and when Vv2_ref' is larger than PWMC, the switch Svp2 is set to "1" (ON), and the switch Svn2, which is not illustrated in FIG. 4, is set to "0" (OFF). With this setting, the positive-side potential Vp of the DC power supply 2 is output as the AC voltage Vv2.

In contrast, when Vv2_ref' is smaller than PWMC, the switch Svp2 is set to "0" (OFF), and the switch Svn2 is set to "1" (ON). With this setting, the negative-side potential Vn of the DC power supply 2 is output as the AC voltage Vv2.

The second three-phase voltage command Vw2_ref' is compared to a PWM carrier wave PWMC with a cycle Tc (=1/fc), and when Vw2_ref' is larger than PWMC, the switch Swp2 is set to "1" (ON), and the switch Swn2, which is not illustrated in FIG. 4, is set to "0" (OFF). With this setting, the positive-side potential Vp of the DC power supply 2 is output as the AC voltage Vw2.

In contrast, when Vw2_ref' is smaller than PWMC, the switch Swp2 is set to "0" (OFF), and the switch Swn2 is set to "1" (ON). With this setting, the negative-side potential Vn of the DC power supply 2 is output as the AC voltage Vw2.

Through the operation above, the AC voltages Vu2, Vv2, and Vw2 output from the second three-phase inverter 3b are PWM voltages with the frequency fc.

The AC voltages Vu1, Vv1, and Vw1 output from the first three-phase inverter 3a and the AC voltages Vu2, Vv2, and Vw2 output from the second three-phase inverter 3b are voltages of a PWM waveform with the frequency fc and hence, conduction noise propagates from the first three-phase inverter 3a and the second three-phase inverter 3b to the DC power supply 2 side.

Figure 5:
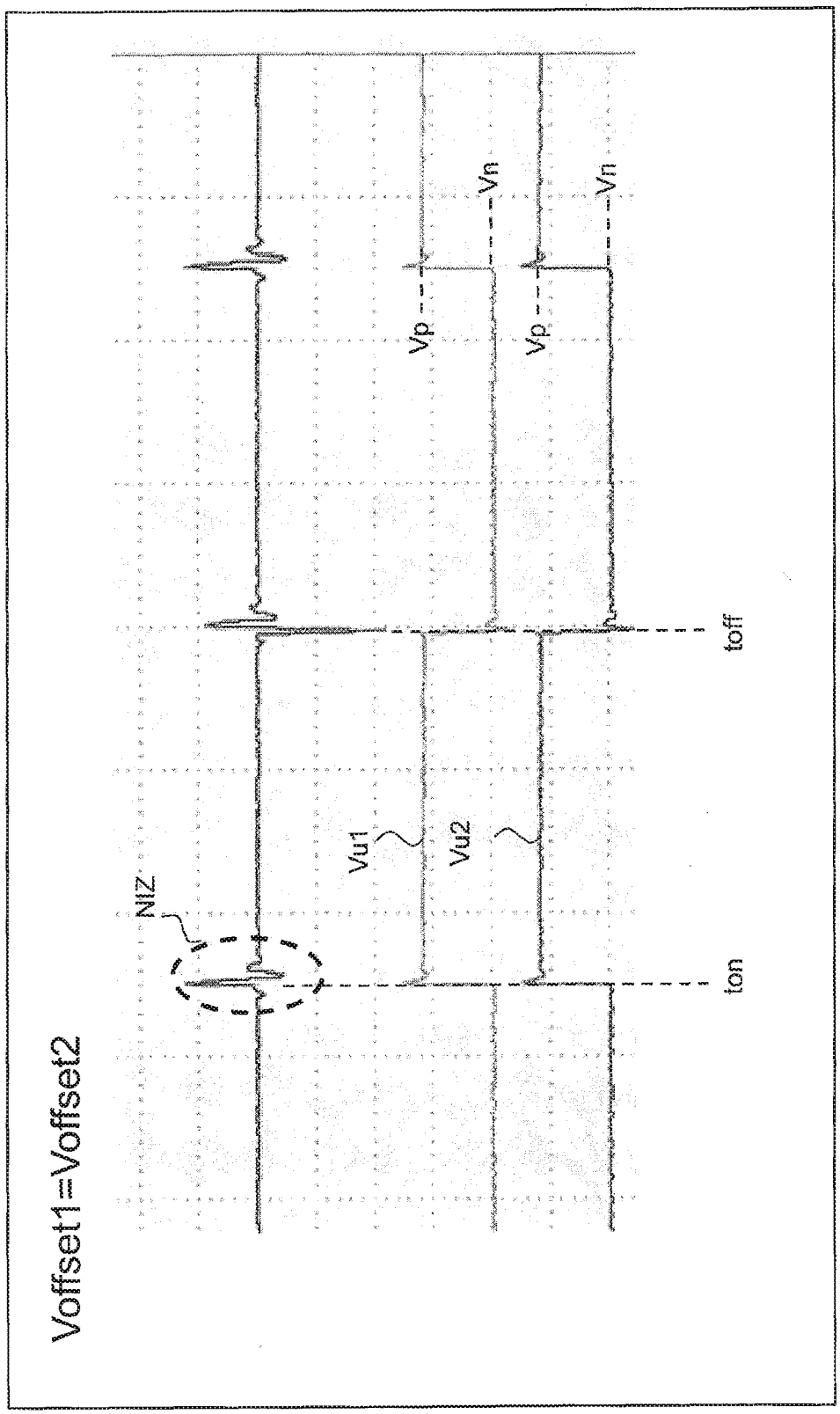
FIG. 5 is a waveform chart for showing actually measured waveforms of conduction noise that propagates from the first and second three-phase inverters to a DC power supply side, in the first embodiment of the present invention.

FIG. 5 is a waveform chart for showing actually measured waveforms of the AC voltages Vu1 and Vu2 and conduction noise NIZ superimposed on the positive-side potential Up of the DC power supply 2 under a state in which Vu1_ref and Vu2_ref are almost equal to each other, and Voffset1 and Voffset2 are set equal to each other. Here, the PWM carrier wave PWMC has the frequency of 20 kHz, and in-phase PWM carrier waves PWMC are applied to the first three-phase inverter 3a and the second three-phase inverter 3b. In this case, the AC voltages Vu1 and Vu2 are substantially equal and hence, the AC voltages Vu1 and Vu2 are substantially equal in terms of on time, that is, a time at which the potential changes from Vn to Vp, and are also substantially equal in terms of off time, that is, a time at which the potential changes from Vp to Vn. Regarding the waveform of the noise NIZ, pulsation appears at around time ton as the on time and at around time toff as the off time.

Figure 6:
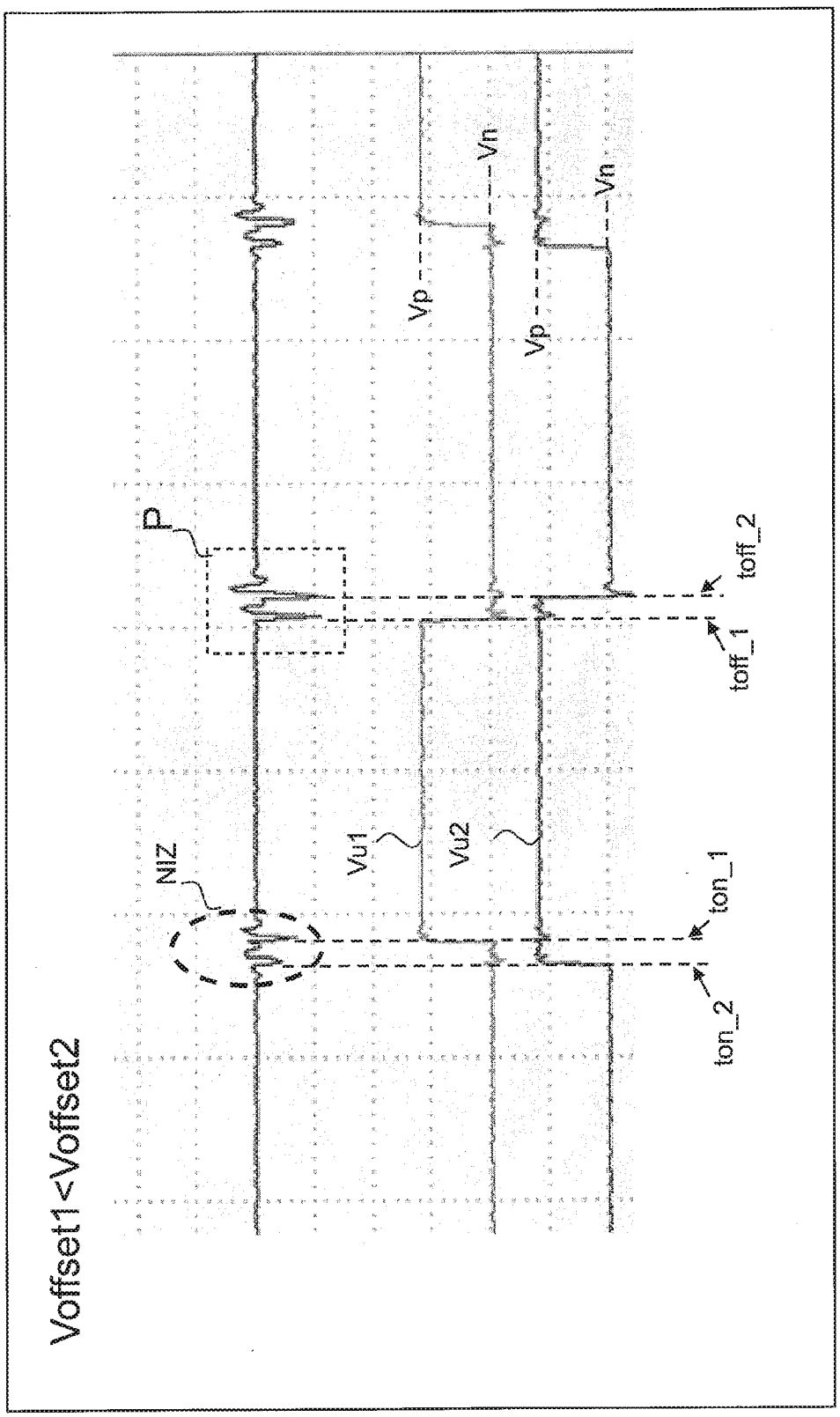
FIG. 6 is a waveform chart for showing actually measured waveforms of conduction noise that propagates from the first and second three-phase inverters to the DC power supply side, in the first embodiment of the present invention.

FIG. 6 is a waveform chart for showing actually measured waveforms of the AC voltages Vu1 and Vu2 and conduction noise NIZ superimposed on the positive-side potential Vp of the DC power supply 2 under a state in which Vu1_ref and Vu2_ref are almost equal to each other, and Voffset2 is set larger than Voffset1. Here, the PWM carrier wave PWMC has the frequency of 20 kHz, and in-phase PWM carrier waves PWMC are applied to the first three-phase inverter 3a and the second three-phase inverter 3b. In this case, the on time of the AC voltage Vu2, that is, a time period in which the AC voltage Vu2 is at the potential Vp, is longer than the AC voltage Vu1, and thus the AC voltage Vu1 and the AC voltage Vu2 are different in terms of the on time and the off time. Regarding the waveform of the noise NIZ, pulsation appears at time ton_1 and time ton_2 as the on time of the AC voltage Vu1 and that of the AC voltage Vu2, respectively, with an amplitude smaller than that of the noise at the time ton of FIG. 5. Further, pulsation appears at time toff_1 and time toff_2 as the off time of the AC voltage Vu1 and that of the AC voltage Vu2, respectively, with an amplitude smaller than that of the noise at the time toff of FIG. 5.

<Noise Reduction Through Adjustment of Difference Between First and Second Average Voltages>

A description is given of how to reduce noise through adjustment of a difference between Voffset1 and Voffset2, that is, a difference between the first average voltage Vave1 and the second average voltage Vave2.

Figure 7:
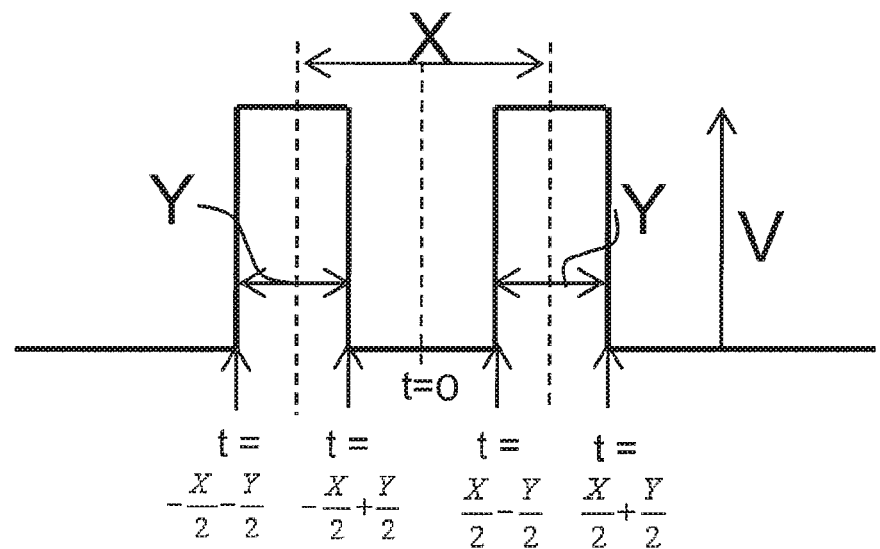
FIG. 7 is a chart for showing an approximate waveform of noise of FIG. 6.

Now, two noise components enclosed by the dotted line P of FIG. 6 are expressed by an approximate waveform of FIG. 7.

In FIG. 7, V represents the height of the respective noise components, Y represents the width of the respective noise components, and X represents an interval between the two noise components.

The PWM carrier wave PWMC has the cycle Tc, and thus this approximate waveform repeatedly appears at the cycle Tc. Thus, Fourier series expansion of the waveform of FIG. 7 yields an n-th order component "an" with respect to the frequency fc of the PWM carrier wave PWMC, which is represented by Expression (1-15). In Expression (1-15), f(x) represents the approximate waveform, and $2\pi$ represents the cycle Tc of the PWM carrier wave PWMC.

$$a_n = \frac{1}{\pi}\int_{-\pi}^{\pi} f(x) \cdot \cos nx\, dx = \frac{4V}{n\pi}\sin\left(\frac{nY}{2}\right)\cos\left(\frac{nX}{2}\right) \quad (1\text{-}15)$$

Of the elements of Expression (1-15) above, only the interval X between the two noise components can be adjusted by the difference between Voffset1 and Voffset2. Thus, it suffices that Expression (1-16) is satisfied to adjust the solution of Expression (1-15) to zero by using X.

$$\frac{nX}{2} = \frac{k_1 \cdot \pi}{2} \quad (1\text{-}16)$$

In Expression (1-16) above, k1 is an odd integer. Specifically, k1= . . . −9, −7, −5, −3, −1, 1, 3, 5, 7, . . . , for example. Solving Expression (1-16) for X gives Expression (1-17).

$$X = \frac{k_1 \cdot \pi}{n} \quad (1\text{-}17)$$

Figure 8:
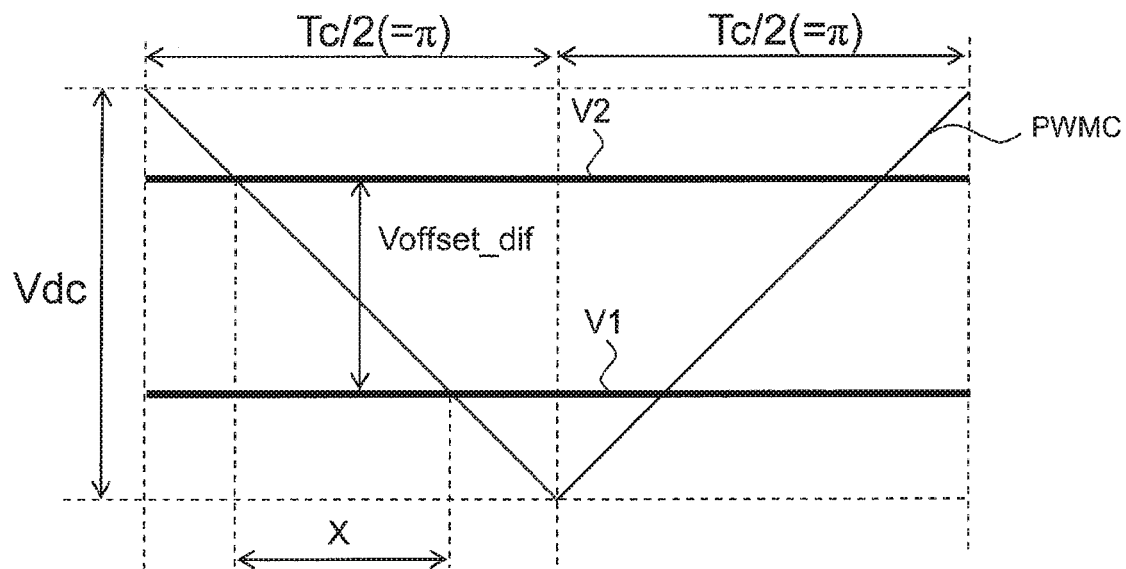
FIG. 8 is a chart for showing a differential voltage being a difference between a first average voltage and a second average voltage, which is used to reduce noise in the first embodiment of the present invention.

Here, on the basis of the example of FIG. 8, Voffset_dif is represented by Expression (1-18) when X is set to an offset voltage difference between the two voltages V1 and V2 to be compared with the PWM carrier wave PWMC.

$$Vdc: \pi = \text{Voffset\_dif}: X \quad (1\text{-}18)$$

Then, substituting Expression (1-17) to Expression (1-18) and solving Expression (1-18) for Voffset_dif gives Expression (1-19).

$$V_{offset\_dif} = \frac{k_1 \cdot V_{dc}}{n} \tag{1-19}$$

As understood from the description above, a differential voltage being a difference between the first average voltage Vave1 and the second average voltage Vave2 used to reduce the n-th order noise component with respect to the frequency fc of the PWM carrier wave PWMC, may be set similar to Voffset_dif represented by Expression (1-19). Further, the n-th order noise component with respect to the frequency fc of the PWM carrier wave PWMC can be reduced when an absolute value Vave_dif_abs of the differential voltage Vave_dif being the difference between the first average voltage Vave1 and the second average voltage Vave2 satisfies Expression (1-20), regardless of which one of the first average voltage Vave1 and the second average voltage Vave2 is larger than the other. Here, Expression (1-20) is derived by replacing k1 of Expression (1-19) with k2. In Expression (1-20), k2 is an odd number equal to or more than one. Specifically, k2=1, 3, 5, 7, 9, . . . , for example.

$$V_{ave\_dif\_abs} = \frac{k_2 \cdot V_{dc}}{n} \tag{1-20}$$

<Setting of n of Expression (1-20) when n is Integer>

A description is given of how to set n of Expression (1-20).

The power conversion device as illustrated in FIG. 1 is required to conform to noise regulation defined by, for example, comité international spécial des perturbations radioélectriques (CISPR), Of noise components subject to the regulation, conduction noise is generally regulated into a range of from 150 kHz to 30 MHz. To conform to the regulation, provided that fr represents a lower limit frequency of the noise regulation that the power conversion device is required to conform to, n is set to an "integer equal to or more than a value obtained by dividing fr by fc", With this operation, noise in a frequency band equal to or higher than fr can be reduced.

For example, when fr is set to 150 kHz, and fc is set to 20 kHz, the minimum value of "integers obtained by dividing fr by fc" is eight and hence, k2 of Expression (1-20) is set to one, and Voffset1 and Voffset2 are set so that the differential voltage Vave_dif being a difference between the first average voltage and the second average voltage satisfies Vdc/8. With this operation, a 160 kHz noise component can be reduced.

Figure 9A:
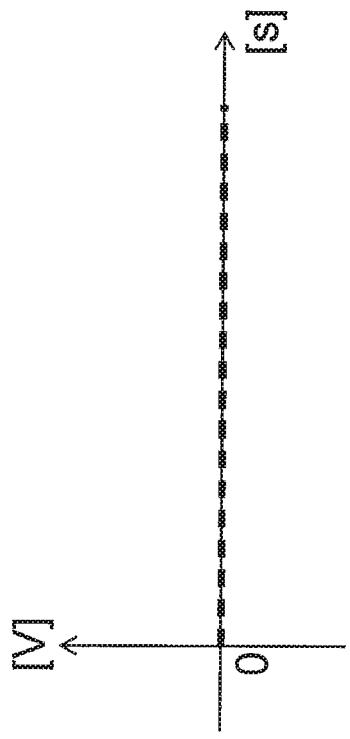
Figure 9C:
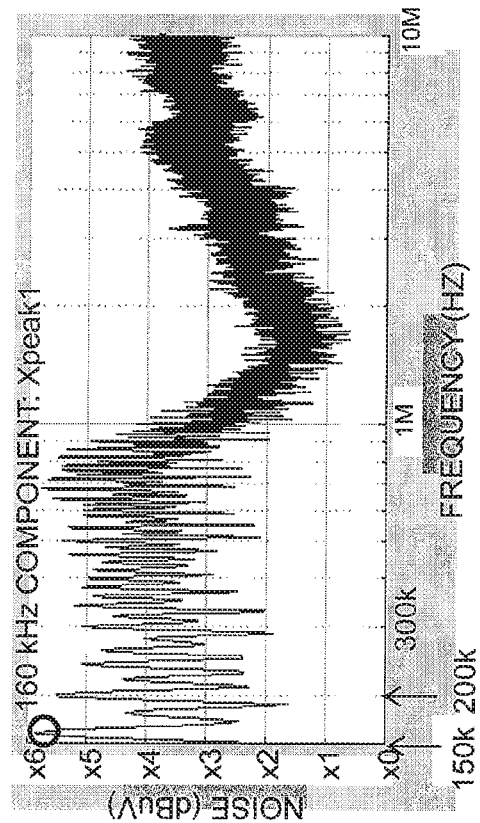
Figure 9B:
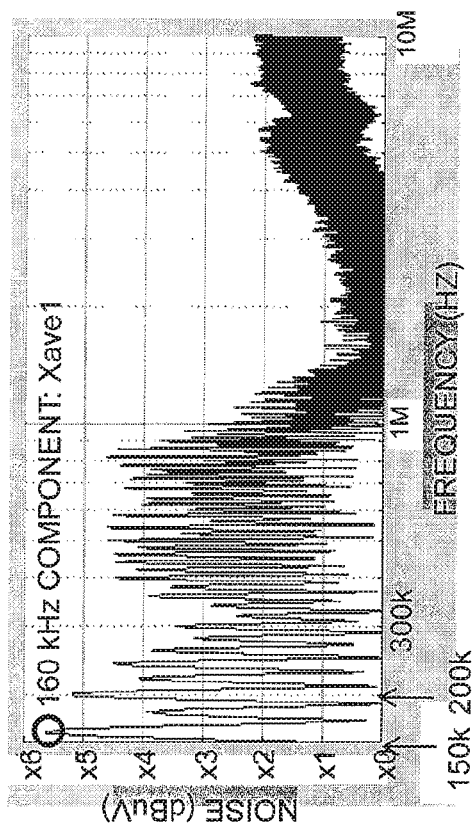

For example, in a case where the DC voltage Vdc is set to 12 V, when the difference between Voffset1 and Voffset2 is fixed to zero as illustrated in FIG. 9A, a 160 kHz noise component has an average value Xave1, which is larger than x5 as illustrated in FIG. 9B, and has a peak value Xpeak1, which is larger than x5.

In charts B and charts C of FIG. 9A to FIG. 12C, there are shown an average value and a peak value, respectively, of actually measured noise under a state in which the first offset voltage Voffset1 and the second offset voltage Voffset2 have a difference that satisfies a relationship of FIG. 9A.

In FIG. 9A to FIG. 12C, the vertical axis of the respective charts B and C represents an increasing noise level; specifically, a larger value on the vertical axis corresponds to a higher noise level. It follows that the noise level increases in the order of x0, x1, x2, x3, x4, x5, and x6. Specifically, the noise level at x5 is lower than that at x6, the noise level at x4 is lower than that at x5, the noise level at x3 is lower than that at x4, the noise level at x2 is lower than that at x3, the noise level at x1 is lower than that at x2, and the noise level at x0 is lower than that at x1.

Figure 10A:
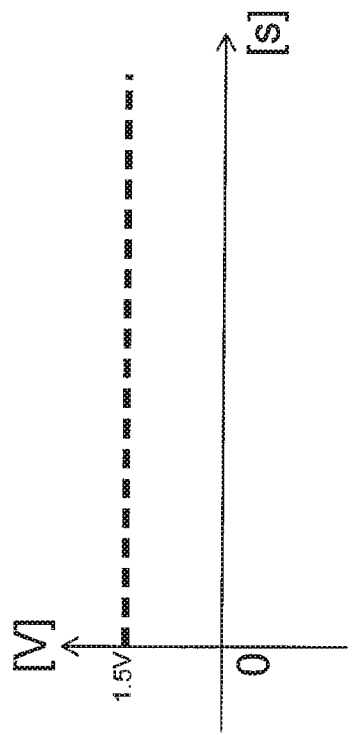
Figure 10C:
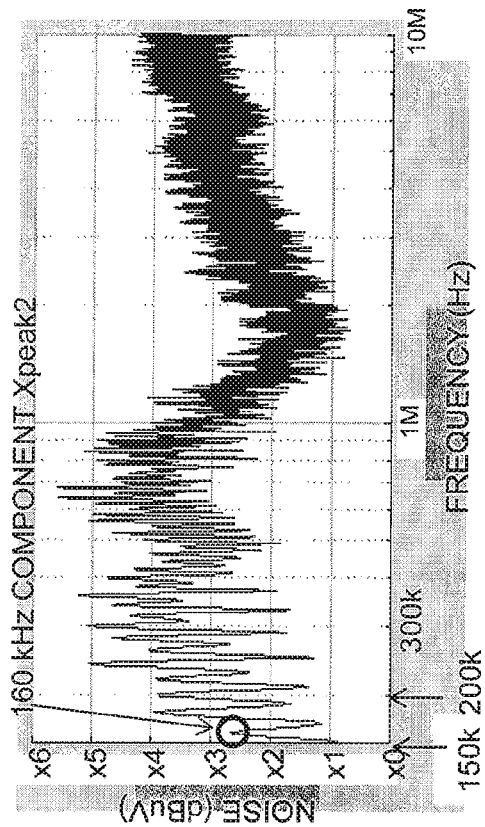
Figure 10B:
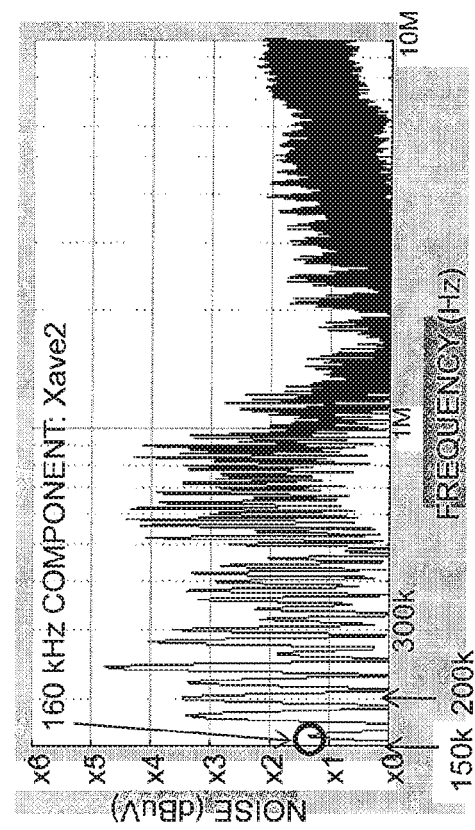

Meanwhile, when the difference between Voffset1 and Voffset2 is fixed to 1.5 V (=Vdc/8=12/8) as shown in FIG. 10A, the average value of the 160 kHz noise components is reduced down to Xave2 that is smaller than x2 as shown in FIG. 10B, and the peak value thereof is suitably reduced to Xpeak2 that is smaller than x3 as shown in FIG. 10O.

Figure 11A:
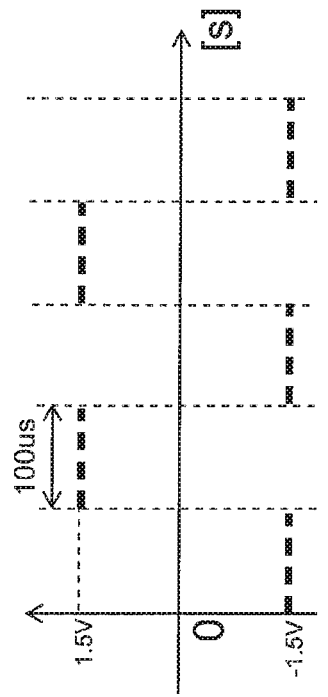
Figure 11C:
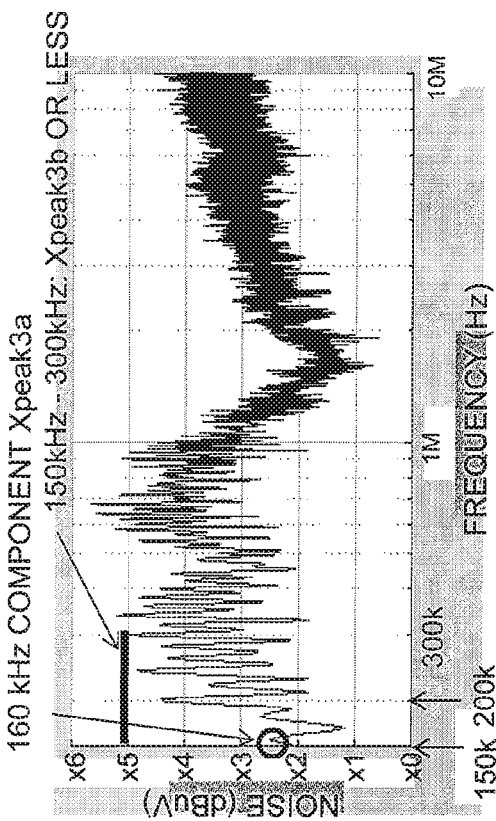
Figure 11B:
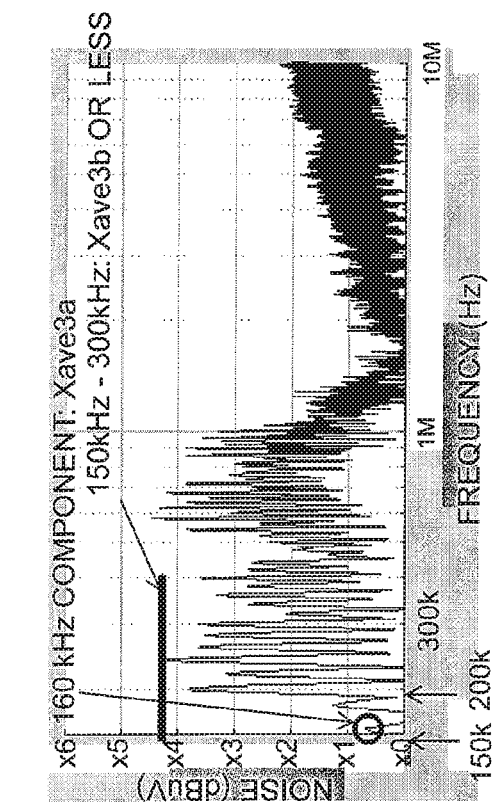

Further, as shown in FIG. 11A, when an absolute value of the difference between Voffset1 and Voffset2 is set to be 1.5 V (=Vdc/8=12/8) in such a way that a value obtained by subtracting Voffset2 from Voffset1 is repeatedly switched between Vdc/8 and −Vdc/8 every 100 μs, the average value of the 160 kHz noise components can be reduced to Xave3a that is smaller than x1 as shown in FIG. 11B, and the peak value thereof can be reduced down to Xpeak3a that is smaller than Xpeak2 of FIG. 10O, as shown in FIG. 11C. Further, when fh represents an upper limit frequency defined by noise regulation that the power conversion device is required to conform to, n is set to an "integer equal to or less than a value obtained by dividing fh by fc". With this operation, noise can be reduced within a range equal to or more than the lower limit frequency fr defined by the noise regulation, and equal to or less than the upper limit frequency fh thereof.

Figure 12A:
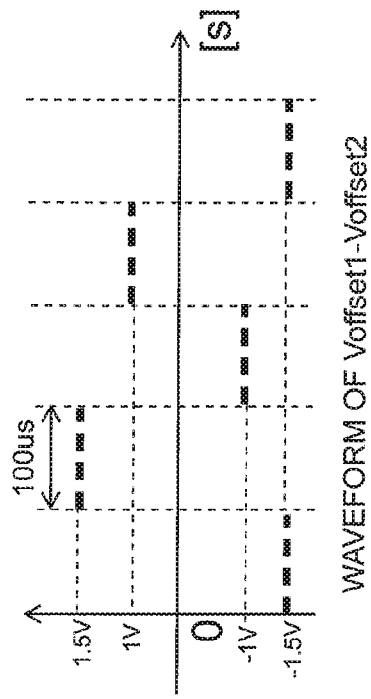
Figure 12C:
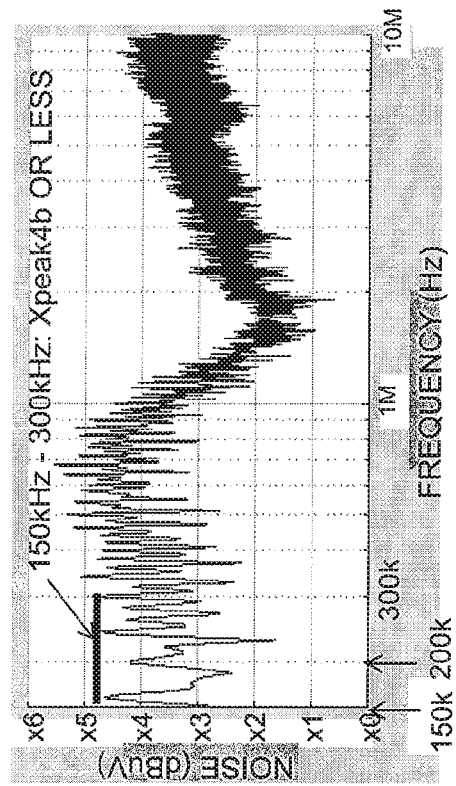
Figure 12B:
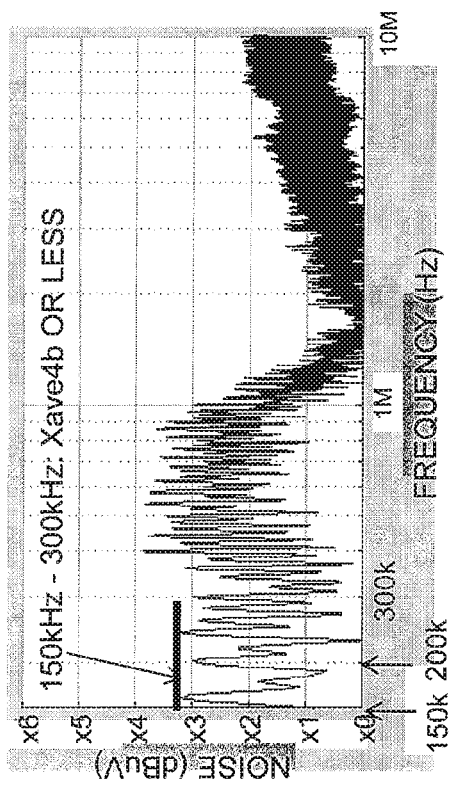

Further, when n of Expression (1-20) is output while being caused to fluctuate at a regular interval that is a positive integral multiple (1, 2, 3, . . . ) of a half cycle (Tc/2) of the PWM carrier wave PWMC, within a range of from the "integer equal to or more than a value obtained by dividing fr by fc" to the "integer equal to or less than a value obtained by dividing fh by fc", noise can be reduced in a wider range equal to or more than the lower limit frequency fr defined by the noise regulation, and equal to or less than the upper limit frequency fh thereof. For example, as compared with the case of FIG. 11A, in which an absolute value of the difference between Voffset1 and Voffset2 is set to 1.5 V (=Vdc/8), when a value obtained by subtracting Voffset2 from Voffset1 is set to fluctuate at a regular interval of 100 μs in the order of −1.5 V (−Vdc/8), 1.5 V (Vdc/8), −1 V (−Vdc/12), 1 V (Vdc/12), and −1.5 V (−Vdc/8) as shown in FIG. 12A so as to reduce noise in a frequency band of from 200 kHz to 300 kHz, the noise in a frequency band of from 150 kHz to 300 kHz can be reduced in a well-balanced manner in terms of an average value, as shown in FIG. 12B. Thus, the worst value in the range above can be reduced from Xave3b between X4 and X5 as shown in FIG. 11B down to Xave4b between X3 and X4 as shown in FIG. 12B. Further, as shown in FIG. 12C, the peak noise can also be reduced from Xpeak3b substantially equal to X5 as shown in FIG. 11C down to Xpeak4b between X4 and X5 as shown in FIG. 12C.

<Setting of n of Expression (1-20) when n is not Limited to Integer>

In the description above, n is an integer, but n may not be an integer. Thus, a description is given below of how to reduce noise on the assumption that n is not necessarily an integer. In Expression (1-20), in order to reduce a noise component having a frequency equal to or more than the lower limit frequency fr defined by the noise regulation that the power conversion device is required to conform to, n is required to satisfy Expression (1-21).

$$n \geq \frac{fr}{fc} \tag{1-21}$$

Substituting Expression (1-21) into Expression (1-20) gives Expression (1-22).

$$\text{Vave\_dif\_abs} \leq \frac{k_2 \cdot fc}{fr} Vdc \tag{1-22}$$

Thus, when the first average voltage Vave1 and the second average voltage Vave2 are set so that an absolute value Vave_dif_abs of the differential voltage being a difference between the first average voltage and the second average voltage satisfies Expression (1-22), it is possible to reduce the noise component having a frequency equal to or more than the lower limit frequency fr defined by the noise regulation to which the power conversion device is required to conform to. Further, in Expression (1-20), in order to reduce a noise component having a frequency equal to or less than the upper limit frequency fh defined by the noise regulation to which the power conversion device is required to conform to, n is required to satisfy Expression (1-23).

$$n \leq \frac{fh}{fc} \tag{1-23}$$

Substituting Expression (1-23) into Expression (1-20) gives Expression (1-24).

$$\text{Vave\_dif\_abs} \geq \frac{k_2 \cdot fc}{fh} Vdc \tag{1-24}$$

Thus, when the first average voltage Vave1 and the second average voltage Vave2 are set so that an absolute value Vave_dif_abs of the differential voltage being a difference between the first average voltage and the second average voltage satisfies Expression (1-24), it is possible to reduce the noise component having a frequency equal to or less than the upper limit frequency fh defined by the noise regulation to which the power conversion device is required to conform to. Further, the absolute value Vave_dif_abs of the differential voltage being a difference between the first average voltage and the second average voltage is output while being caused to fluctuate at a regular interval that is a positive integral multiple (1, 2, 3, . . . ) of half the cycle (Tc/2) of the PWM carrier wave PWMC, within a range that satisfies both of Expression (1-22) and Expression (1-24). With this operation, noise can be reduced in a wider frequency range as in the example of FIG. 12B which gives the above-mentioned effects in comparison with the example of FIG. 11B. More specifically, the absolute value Vave_dif_abs of the differential voltage being a difference between the first average voltage Vave1 and the second average voltage Vave2, may be set as indicated by a curve of FIG. 13 at respective frequencies of noise to be reduced so that the absolute value of the differential voltage fluctuates within the frequency range of the noise to be reduced.

Figure 13:
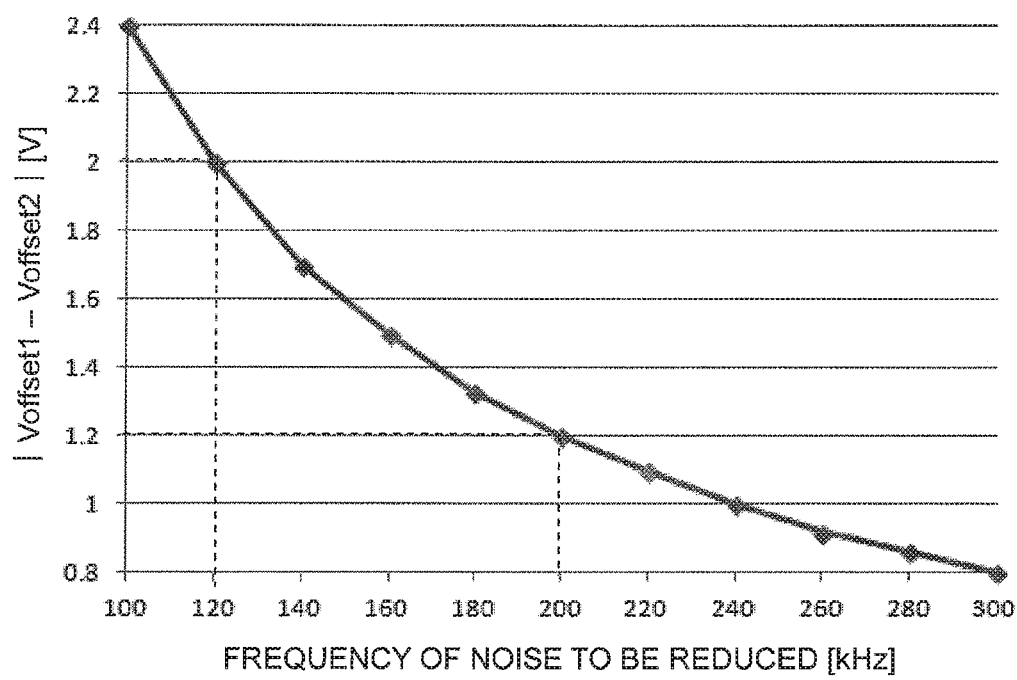
FIG. 13 is a graph for showing a relationship between an absolute value |Voffset1−Voffset2| of a difference between a first offset voltage Voffset1 and a second offset voltage Voffset2 and a frequency of noise to be reduced, in the first embodiment of the present invention.

FIG. 13 is a graph for showing a relationship between the absolute value Vave_dif_abs of the differential voltage Vave_dif being a difference between the first average voltage Vave1 and the second average voltage Vave2, which set placed on the vertical axis, and a frequency of noise to be reduced, which is set on the horizontal axis, under a state in which Vdc=12 V and fc=20 kHz.

As understood from the description above, in the first embodiment, noise can be reduced only by adjusting the differential voltage being a difference between the first average voltage and the second average voltage. The present invention is applicable to a case in which in-phase PWM carrier waves PWMC are applied to the first inverter and the second inverter and hence, it is not required to displace phases of the PWM carrier waves PWMC to be applied to the first inverter and the second inverter, so that the mounting operation is facilitated. Further, as can be seen from the fact that an operation of causing the frequencies of the plurality of PWM carrier waves PWMC to fluctuate is not required unlike the apparatus of Patent Literature 1, the mounting operation is easy to execute.

Further, regarding an end product, when it is required to reduce noise in a different frequency band, the apparatus of Patent Literature 1 is required to change the PWM carrier wave PWMC, leading to a problem that long adjustment time is required, whereas according to the present invention, noise can be reduced only by adjusting the differential voltage being a difference between the first average voltage and the second average voltage with reference to FIG. 13, for example, leading to an advantageous effect that a desired change can be made easily and the adjustment time therefor can be reduced. For example, when a 200 kHz noise component is to be reduced, the absolute value of the differential voltage being a difference between the first average voltage and the second average voltage may be set to 1.2 V with reference to FIG. 13. Likewise, when a 120 kHz noise component is to be reduced, for example, the absolute value of the differential voltage being a difference between the first average voltage and the second average voltage may be set to 2 V.

Further, in the first embodiment, the first three-phase inverter and the second three-phase inverter are used by way of example, but the present invention is not limited to the three-phase configuration, and it is to be understood that the same effects can be produced by a first multi-phase inverter and a second multi-phase inverter, which have two or more phases. In this case, multi-phase drive voltage commands, multi-phase voltage commands, and other such commands are used as the three-phase drive voltage commands, the three-phase voltage commands, and other such commands.

Further, in the first embodiment, the absolute value Vave_dif_abs of the differential voltage Vave_dif being a difference between the first average voltage Vave1 and the second average voltage Vave2 is adjusted by adjusting the first offset voltage Voffset1 and the second offset voltage Voffset2 by way of example.

However, when spatial vector modulation is employed to generate a PWM signal, the first average voltage Vave1 and the second average voltage Vave2 may be adjusted by adjusting a proportion of two zero-voltage vectors to be generated for the first multi-phase inverter (3a), that is, V0 (corresponding to a switching pattern in which the switches Sun1, Svn1, and Swn1 on the negative side of the DC power supply are turned on in all phases; in the three-phase configuration example of FIG. 3, switch Sup1=0 (OFF), switch Svp1=0 (OFF), and switch Swp1=0 (OFF)), and V7 (corresponding to a switching pattern in which the switches Sup1, Svp1, and Swp1 on the positive side of the DC power supply are turned on in all phases; in the three-phase configuration example of FIG. 3, switch Sup1=1 (ON), switch Svp1=1 (ON), and switch Swp1=1 (ON)), and a proportion of two zero-voltage vectors to be generated for the second multi-phase inverter (3b), that is, V0 (corresponding to a switching pattern in which the switches Sun2, Svn2, and Swn2 on the negative side of the DC power supply are turned on in all phases; in the three-phase configuration example of FIG. 4, switch Sup2=0 (OFF), switch Svp2=0 (OFF), and switch Swp2=0 (OFF)) and V7 (corresponding to a switching pattern in which the switches Sup2, Svp2, and Swp2 on the positive side of the DC power supply are turned on in all phases; in the three-phase configuration example of FIG. 4, switch Sup2=1 (ON), switch Svp2=1 (ON), and switch Swp2=1 (ON)).

Further, in the first embodiment, as a load connected to the first three-phase inverter and the second three-phase inverter, the AC rotating machine having the two sets of three-phase windings is described by way of example, but the present invention is not limited thereto. For example, it is to be understood that the first three-phase inverter and the second three-phase inverter can be connected to different AC rotating machines.

Here, a voltage adjustment control unit 6a is configured to carry out the above-mentioned control such as adjustment of the absolute value Vave_dif_abs of the differential voltage Vave_dif being a difference between the first average voltage Vave1 and the second average voltage Vave2, which is executed by adjusting the first offset voltage Voffset1 and the second offset voltage Voffset2. Further; the voltage adjustment control unit 6a can adjust the first offset voltage Voffset1 and the second offset voltage Voffset2 in accordance with a frequency f of noise to be reduced, which is applied from the outside, with reference to FIG. 13, for example.

Second Embodiment

Figure 14:
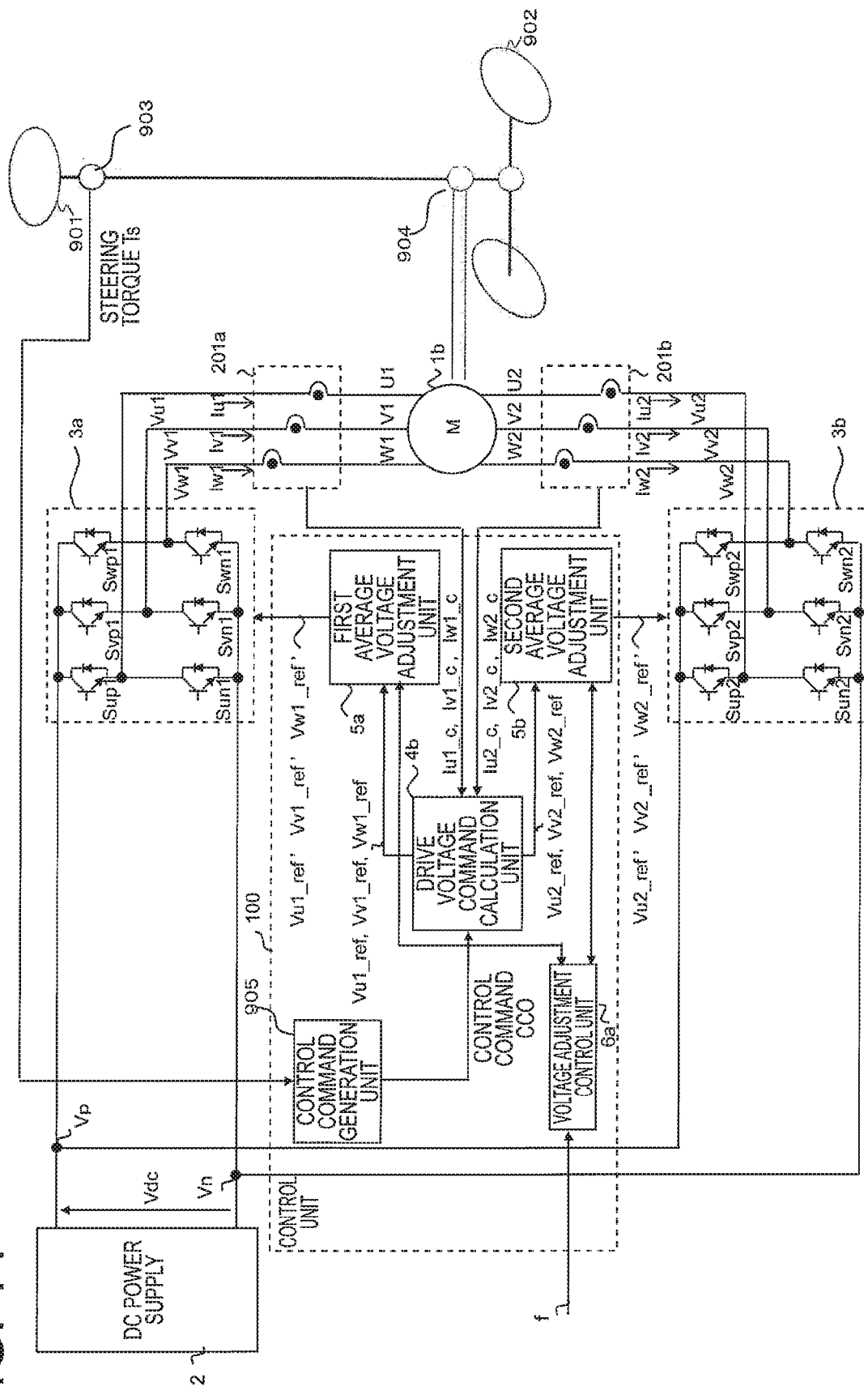
FIG. 14 is a diagram for illustrating an overall configuration of an electric power steering apparatus according to a second embodiment of the present invention.

FIG. 14 is a diagram for illustrating an overall configuration of an electric power steering apparatus according to a second embodiment of the present invention.

A driver turns a steering wheel 901 to the right or left to steer front wheels 902. A torque detecting device 903 is configured to detect a steering torque Ts of a steering system, and output the detected torque Ts to a control command generating unit 905 as described below. The AC rotating machine 1 is configured to generate an assist torque for assisting the driver in steering via a gear 904, and a rotor thereof is mechanically connected to the gear 904. The other configuration thereof is the same as that of the AC rotating machine 1 of FIG. 1.

The control command generating unit 905 is configured to calculate the control command CC© used to control the AC rotating machine 1 into a desired condition based on the driver's steering torque Ts output from a torque sensor 903. As the control command CC© to be output, a torque current command I_target is calculated as represented by Expression (2-1).

$$I\_target = ka \cdot Ts \qquad (2\text{-}1)$$

In Expression (2-1), ka is a constant, which can be set to vary depending on the steering torque Ts or a travel speed of a vehicle. In this example, the torque current command I_target is determined based on Expression (2-1), but can be set through well-known compensation control executed in accordance with a steering condition.

Subsequently, a current detecting device 201a is used to detect currents Iu1, Iv1, and Iw1 that flow on an output side of the first three-phase inverter 3a, as current signals Iu1_c, Iv1_c, and Iw1_c, respectively, in the vicinity of the peak of the PWM carrier wave PWMC. The term "peak" used herein refers to the minimum value (−Vdc/2) or the maximum value (Vdc/2) of the PWM carrier wave PWMC. In this embodiment, the PWM carrier wave PWMC is assumed to have a constant cycle Tc (=1/Fc).

A current detecting device 201b is configured to detect currents Iu2, Iv2, and Iw2 that flow on the output side of the second three-phase inverter 3b as current signals Iu2_c, Iv2_c, and Iw2_c, respectively, in the vicinity of the peak of the PWM carrier wave PWMC.

The drive voltage command calculation unit 4a is configured to calculate the first three-phase drive voltage commands Vu1_ref, Vv1_ref, and Vw1_ref and the second three-phase drive voltage commands Vu2_ref, Vv2_ref, and Vw2_ref, which are used to drive the AC rotating machine 1, based on the control command COO (I_target), the current signals Iu1_c, Iv1_c, and Iw1_c detected by the current detecting device 201a, and the current signals Iu2_c, Iv2_c, and Iw2_c detected by the current detecting device 201b.

The first three-phase drive voltage commands Vu1_ref, Vv1_ref, and Vw1_ref are obtained by coordinate transformation, into voltage commands on stationary three-phase axes, of two-rotation-axes voltages obtained through proportional integration control of a difference between: two-rotation-axes currents obtained by coordinate transformation of the current signals Iu1_c, Iv1_c, and Iw1_c based on the rotational position of the AC rotating machine 1, or based on a publicly-known rotational position estimation method; and the torque current command I_target and an exciting current command.

Further, the second three-phase drive voltage commands Vu2_ref, Vv2_ref, and Vw2_ref are obtained by coordinate transformation, into voltage commands on stationary three-phase axes, of two-rotation-axes voltages obtained through proportional integration control of a difference between: two-rotation-axes currents obtained by coordinate transformation of the current signals Iu2_c, Iv2_c, and Iw2_c based on the rotational position of the AC rotating machine 1, or based on a publicly-known rotational position estimation method; and the control command I_target and an exciting current command.

Advantageous effects in the second embodiment are described below. The primary importance of the electric power steering apparatus is a stability of each of the current detecting devices 201a and 201b. To ensure the stability in current control, it is required to detect at regular intervals a motor current, that is, the currents Iu1, Iv1, and Iw1, and the currents Iu2, Iv2, and Iw2. Thus, in the second embodiment, a triangular wave that repeats itself at the same cycle is used as the PWM carrier wave PWMC, and the motor current is detected in the vicinity of the peak thereof. The PWM carrier wave PWMC with the same cycle is used, and thus a period between the vicinity of a peak of the PWM carrier wave PWMC in one cycle and the vicinity of a peak of the PWM carrier wave PWMC in the next cycle is constant all the time. Therefore, the motor current can be detected at regular intervals, to thereby ensure the stability of each of the current detecting devices 201a and 201b.

Next, it is required to detect a current flowing through the AC rotating machine 1 with high accuracy for the control of the electric power steering. This is because when the detected current includes an error with respect to a fundamental wave thereof, the proportional integral control is executed so that the current with the error matches a current command value, with the result that torque ripple occurs in the AC rotating machine 1, and is transmitted to the steering wheel 1 via the gear 904, to thereby impair a steering feeling of a driver.

To address this issue, in the second embodiment, the current is detected at a timing in the vicinity of the peak of the PWM carrier wave PWMC and hence, the fundamental wave thereof can be detected from the current containing a ripple component resulting from the PWM signal. Therefore, the current can be detected with high accuracy, and the torque ripple caused in the AC rotating machine 1 is not increased, so that a driver can have a favorable feeling in steering the steering wheel.

On the other hand, with the method described in Patent Literature 1, in which the cycle of the PWM carrier wave PWMC is changed, when a current is detected at regular intervals so as to ensure a stability of a drive voltage command calculation unit, the current cannot be necessarily detected in the vicinity of the peak of the PWM carrier wave PWMC, and the detected current includes an error resulting from a ripple component caused by the PWM signal. This impairs the feeling in steering the steering wheel. Further, when the motor current is detected at a timing in the vicinity of the peak of the PWM carrier wave PWMC in order to detect the motor current with high accuracy, the cycle of the PWM carrier wave PWMC is changed and hence, the current cannot be detected at regular intervals, which hinders stable control. In particular, when the PWM carrier wave PWMC has a long cycle, the motor current is detected at large intervals, leading to unstable current control. In view of the above, the method described in Patent Literature 1 cannot ensure both of noise reduction and high-accuracy, stable current control.

As described above, in the second embodiment, the triangular wave with the same cycle is used as the PWM carrier wave PWMC, the current detecting device is caused to detect the motor current at a timing in the vicinity of the peak of the PWM carrier wave PWMC, and the drive command voltage calculation unit is configured to calculate a voltage command based on the current detected at the timing. This configuration produces a remarkable effect that cannot be produced by the related-art technology. Specifically, the effect of noise reduction described in the first embodiment can be achieved while maintaining the stability of current control and the favorable feeling in steering the steering wheel.

In the respective embodiments above, a control unit 100 having the respective functions as illustrated in FIG. 1 and FIG. 14 may be configured by different control circuits, or configured by a single integrated control circuit.

Regarding this point, each of the processing circuits for implementing those functions may be constructed by dedicated hardware or a central processing unit (CPU, which is also referred to as "processing unit", "arithmetic unit", "microprocessor", "microcomputer", "processor", or "DSP") for executing a program stored in a memory.

Figure 15A:
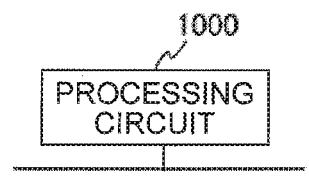
FIG. 15A and FIG. 15B are diagrams for illustrating an example of a hardware configuration of a control unit in the power conversion device and an electric power steering apparatus according to one embodiment of the present invention.
Figure 15B:
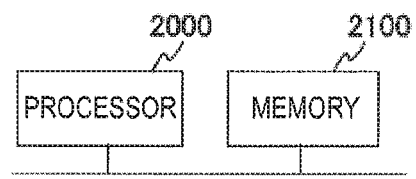

FIG. 15A and FIG. 15B are schematic illustrations of hardware configurations in a case where those functions are constructed by hardware and a case where those functions are constructed by software, respectively.

When the functions of the above-mentioned respective components are constructed by hardware illustrated in FIG. 15A, a processing circuit 1000 corresponds to, for example, a single circuit, a complex circuit, a programmed processor, a processor for a parallel program, an ASIC, an FPGA, or a combination thereof. The functions of the above-mentioned respective components may be implemented by a processing circuit, or the functions of the components may altogether be implemented by a processing circuit.

When the functions of the above-mentioned respective components are constructed by a CPU illustrated in FIG. 15B, the functions of the respective components are implemented by software, firmware, or a combination of software and firmware. The software and the firmware are described as programs, and are stored in a memory 2100. A processor 2000, which is a processing circuit, reads out and executes the programs stored in the memory 2100, to thereby implement the functions of the respective components. Those programs may be considered as programs for causing a computer to execute the procedures and the methods of the respective components. In this case, the memory 2100 corresponds to, for example, a nonvolatile or volatile semiconductor memory such as a RAM, a ROM, a flash memory, an EPROM, or an EEPROM, or to a magnetic disk, a flexible disk, an optical disc, a compact disc, a mini disc, or a DVD.

The functions of the respective components may be implemented partially by dedicated hardware, and partially by software or firmware.

In this way, the processing circuit can implement each of the above-mentioned functions by hardware, software, firmware, or a combination thereof.

Moreover, various types of information required for the processing are set to the circuit in advance in the case of the hardware configuration, and are stored in the memory in advance in the case of the software configuration.

As described above, the power conversion device according to one embodiment of the present invention includes:

a first multi-phase inverter (3a) and a second multi-phase inverter (3b), which are configured to receive a DC voltage output from a DC power supply (2), and execute power conversion to convert the DC voltage into AC voltages and then output the resultant AC voltages;

a drive voltage command calculation unit (4a) configured to calculate first multi-phase drive voltage commands (Vu1_ref, Vv1_ref, Vw1_ref) and second multi-phase drive voltage commands (Vu2_ref, Vv2_ref, Vw2_ref), which cause the first multi-phase inverter (3a) and the second multi-phase inverter (3b) to drive a load based on an external control command (CCO);

a first average voltage adjustment unit (5a) configured to output, as first multi-phase voltage commands (Vu1_ref', Vv1_ref', Vw1_ref'), values obtained by adjusting the first multi-phase drive voltage commands (Vu1_ref, Vv1_ref, Vw1_ref) with use of a first offset voltage (Voffset1), to thereby control the first multi-phase inverter (3a);

a second average voltage adjustment unit (5b) configured to output, as second multi-phase voltage commands (Vu2_ref', Vv2_ref', Vw2_ref'); values obtained by adjusting the second multi-phase drive voltage commands (Vu2_ref, Vv2_ref, Vw2_ref) with use of a second offset voltage (Voffset2), to thereby control the second multi-phase inverter (3b); and a voltage adjustment control unit (6a) configured to, when the DC voltage of the DC power supply (2) is represented by Vdc, a frequency of a PWM signal (Vu1; Vv1, Vw1, Vu2, Vv2, Vw2) of each of the first multi-phase inverter (3a) and the second multi-phase inverter (3b) is represented by fc; and a lower limit frequency defined by noise regulation to which the power conversion device is required to conform is represented by fr, control the first average voltage adjustment unit (5a) and the second average voltage adjustment unit (5b) so that an absolute value (Vave_dif_abs) of a differential voltage (Vave_dif) being a difference between: a first average voltage (Vave1), which is an average value of the first multi-phase voltage commands (Vu1_ref', Vv1_ref', Vw1_ref') of respective phases as command values for the AC voltages to be output from the first multi-phase inverter (3a); and a second average voltage (Vave2), which is an average value of the second multi-phase voltage commands (Vu2_ref', Vv2_ref', Vw2_ref') of respective phases as command values for the AC voltages to be output from the second multi-phase inverter (3b), is equal to or less than a value derived from Expression (1):

$$k2 \cdot fc/fr \cdot Vdc [V] \qquad (1)$$

where k2 represents an odd number equal to or more than one.

Further, the voltage adjustment control unit (6a) is configured to, when fh represents an upper limit frequency defined by noise regulation to which the power conversion device is required to conform, control the first average voltage adjustment unit (5a) and the second average voltage adjustment unit (5b) so that an absolute value of the differential voltage (Vave_dif_abs) is equal to or more than a value derived from Expression (2):

$$k2 \neq fc \cdot fh \cdot Vdc [V] \qquad (2).$$

Further, the voltage adjustment control unit (6a) is configured to control the first average voltage adjustment unit (5a) and the second average voltage adjustment unit (5b) so that the absolute value of the differential voltage (Vave_dif_abs) is changed in a range equal to or less than the value derived from Expression (1), and equal to or more than the value derived from Expression (2) at a regular interval that is a positive integral multiple of a half cycle of the PWM signal.

Further, the power conversion device according to one embodiment of the present invention includes:

a first multi-phase inverter (3a) and a second multi-phase inverter (3b), which are configured to receive a DC voltage output from a DC power supply (2), and execute power conversion to convert the DC voltage into AC voltages and then output the resultant AC voltages;

a drive voltage command calculation unit (4a) configured to calculate first multi-phase drive voltage commands (Vu1_ref, Vv1_ref, Vw1_ref) and second multi-phase drive voltage commands (Vu2_ref, Vv2_ref, Vw2_ref), which cause the first multi-phase inverter (3a) and the second multi-phase inverter (3b) to drive a load based on an external control command (CCO);

a first average voltage adjustment unit (5a) configured to output, as first multi-phase voltage commands (vu1_ref', Vv1_ref', Vw1_ref'), values obtained by adjusting the first multi-phase drive voltage commands (Vu1_ref, Vv1_ref, Vw1_ref) with use of a first offset voltage (Voffset1), to thereby control the first multi-phase inverter (3a);

a second average voltage adjustment unit (5b) configured to output, as second multi-phase voltage commands (vu2_ref', Vv2_ref', Vw2_ref'), values obtained by adjusting the second multi-phase drive voltage commands (Vu2_ref; Vv2_ref; Vw2_ref) with use of a second offset voltage (Voffset2) to thereby control the second multi-phase inverter (3b); and a voltage adjustment control unit (6a) configured to, when the DC voltage of the DC power supply (2) is represented by Vdc, a frequency of a PWM signal (Vu1, Vv1, Vw1, Vu2, Vv2) of each of the first multi-phase inverter (3a) and the second multi-phase inverter (3b) is represented by fc, and a lower limit frequency defined by noise regulation to which the power conversion device is required to conform is represented by fr, control the first average voltage adjustment unit (5a) and the second average voltage adjustment unit (5b) so that an absolute value (Vave_dif_abs) of a differential voltage (Vave_dif) being a difference between: a first average voltage (Vave1), which is an average value of the first multi-phase voltage commands (vu1_ref', Vv1_ref', Vw1_ref') of respective phases as command values for the AC voltages to be output from the first multi-phase inverter (3a); and a second average voltage (Vave2), which is an average value of the second multi-phase voltage commands (vu2_ref', Vv2_ref', Vw2_ref') of respective phases as command values for the AC voltages to be output from the second multi-phase inverter (3b), is a value derived from Expression (3):

$$k2 \cdot Vdc/n [V] \qquad (3)$$

where the value of n is an integer equal to or more than (f c) obtained by dividing fr by fc, and k2 represents an odd number equal to or more than one.

Further, the voltage adjustment control unit (6a) is configured to, when an upper limit frequency defined by the noise regulation to which the power conversion device is required to conform is represented by fh, set the value of n derived from Expression (3) to an integer equal to or less than (fh/fc) obtained by dividing fh by fc.

Further, the voltage adjustment control unit (6a) is configured to control the first average voltage adjustment unit (5a) and the second average voltage adjustment unit (5b) so as to change the (Vave_dif_abs) of the differential voltage by changing the value n at a regular interval that is a positive integral multiple of a half cycle of the PWM signal, as the differential voltage.

Further, the power conversion device according to one embodiment of the present invention includes:

a first multi-phase inverter (3a) and a second multi-phase inverter (3b), which are configured to receive a DC voltage output from a DC power supply (2), and execute power conversion to convert the DC voltage into AC voltages and then output the resultant AC voltages;

a drive voltage command calculation unit (4a) configured to calculate first multi-phase drive voltage commands (Vu1_ref, Vw1_ref) and second multi-phase drive voltage commands (Vu2_ref, Vv2_ref, Vw2_ref), which cause the first multi-phase inverter (3a) and the second multi-phase inverter (3b) to drive a load based on an external control command (CCO);

a first average voltage adjustment unit (5a) configured to output, as first multi-phase drive voltage commands (Vu1_ref', Vv1_ref', Vw1_ref'), values obtained by adjusting the first multi-phase drive voltage commands (Vu1_ref, Vv1_ref, Vw1_ref) with use of a first offset voltage (Voffset1), to thereby control the first multi-phase inverter (3a);

a second average voltage adjustment unit (5b) configured to output, as second multi-phase voltage commands (vu2_ref', Vv2_ref', Vw2_ref'), values obtained by adjusting the second multi-phase drive voltage commands (Vu2_ref, Vv2_ref, Vw2_ref) with use of a second offset voltage (Voffset2), to thereby control the second multi-phase inverter (3b); and a voltage adjustment control unit (6a) configured to, when the DC voltage of the DC power supply (2) is represented by Vdc, a PWM signal of each of the first multi-phase inverter (3a) and the second multi-phase inverter (3b) has a frequency of 20 kHz, and an upper limit frequency defined by noise regulation to which the power conversion device is required to conform, is 150 kHz, control the first average voltage adjustment unit (5a) and the second average voltage adjustment unit (5b) so that a differential voltage (Vave_diff) being a difference between: a first average voltage (Vave1), which is an average value of the first multi-phase drive voltage commands (Vu1_ref', Vv1_ref', Vw1_ref') of respective phases as command values for the AC voltages to be output from the first multi-phase inverter (3a); and a second average voltage (Vave2), which is an average value of the second multi-phase voltage commands (vu2_ref', Vv2_ref', Vw2_ref') of respective phases as command values for the AC voltages to be output from the second multi-phase inverter (3b), is changed in a range including a value derived from Expression (4):

$$Vdc/8[V] \quad (4)$$

at a regular interval that is a positive integral multiple.

Further, the voltage adjustment control unit (6a) is configured to set the differential voltage (Vave_diff) in a range including a value derived from Expression (5):

$$-Vdc/8[V] \quad (5).$$

Further, the voltage adjustment control unit (6a) is configured to set the differential voltage (Vave_diff) in a range including a value derived from at least one of Expression (6) or (7):

$$Vdc/12[V] \quad (6),$$

$$-Vdc/12[V] \quad (7).$$

Further, the electric power steering apparatus according to one embodiment of the present invention includes:
any one of the power conversion devices described above; and
an AC rotating machine (1) configured to generate an assist torque for assisting a driver in steering, by the first multi-phase inverter (3a) and the second multi-phase inverter (3b) applying the AC voltages.

INDUSTRIAL APPLICABILITY

The power conversion device and the electric power steering apparatus according to one embodiment of the present invention are applicable to various types of power conversion devices and electric power steering apparatus.

REFERENCE SIGNS LIST

1 AC rotating machine, 2 DC power supply, 3a, 3b three-phase inverter, 4a drive voltage command calculation unit, 5a first average voltage adjustment unit, 5b second average voltage adjustment unit, 6a voltage adjustment control unit, 100 control unit, 201a, 201b current detecting device, 901 handle, 902 front wheel, 903 torque sensor, 903 torque detecting device, 904 gear, 905 control command generating unit, 1000 processing circuit, 2000 processor, 2100 memory, Sup2, Svp2, Swp2 switch on positive side of DC power supply, Sun2, Svn2, Swn2 switch on negative side of DC power supply, U1, V1, W1, U2, V2, W2 three-phase winding

The invention claimed is:

1. A power conversion device, comprising:
a first multi-phase inverter and a second multi-phase inverter to receive a DC voltage output from a DC power supply, and execute power conversion to convert the DC voltage into AC voltages and then output the resultant AC voltages;
a drive voltage command calculator to calculate first multi-phase drive voltage commands and second multi-phase drive voltage commands, which cause the first multi-phase inverter and the second multi-phase inverter to drive a load based on an external control command;
a first average voltage adjuster to output, as first multi-phase voltage commands, values obtained by adjusting the first multi-phase drive voltage commands with use of a first offset voltage, to thereby control the first multi-phase inverter;
a second average voltage adjuster to output, as second multi-phase voltage commands, values obtained by adjusting the second multi-phase drive voltage commands with use of a second offset voltage, to thereby control the second multi-phase inverter; and
a voltage adjustment controller to,
when the DC voltage of the DC power supply is represented by Vdc, a frequency of a PWM signal of each of the first multi-phase inverter and the second multi-phase inverter is represented by fc, and a lower limit frequency defined by noise regulation to which the power conversion device is required to conform is represented by fr,
control the first average voltage adjuster and the second average voltage adjuster so that an absolute value of a differential voltage being a difference between: a first average voltage, which is an average value of the first multi-phase voltage commands of respective phases as command values for the AC voltages to be output from the first multi-phase inverter; and a second average voltage, which is an average value of the second multi-phase voltage commands of respective phases as command values for the AC voltages to be output from the second multi-phase inverter, is equal to or less than a value derived from Expression (1):

$$k2 \cdot fc/fr \cdot Vdc[V] \quad (1)$$

where k2 represents an odd number equal to or more than one.

2. The power conversion device according to claim 1, wherein the voltage adjustment controller,
when an upper limit frequency defined by noise regulation to which the power conversion device is required to conform is represented by fh,
controls the first average voltage adjuster and the second average voltage adjuster so that the absolute value of the differential voltage is equal to or more than a value derived from Expression (2):

$$k2 \cdot fc/fh \cdot Vdc[V] \quad (2).$$

3. The power conversion device according to claim 2, wherein the voltage adjustment controller controls the first average voltage adjuster and the second average voltage adjuster so that the absolute value of the differential voltage is changed in a range equal to or less than the value derived from Expression (1), and equal to or more than the value derived from Expression (2) at a regular interval that is a positive integral multiple of a half cycle of the PWM signal.

4. An electric power steering apparatus, comprising:
the power conversion device of claim 1; and
an AC rotating machine to generate an assist torque for assisting a driver in steering, by the first multi-phase inverter and the second multi-phase inverter applying the AC voltages.

5. A power conversion device, comprising:
a first multi-phase inverter and a second multi-phase inverter to receive a DC voltage output from a DC power supply, and execute power conversion to convert the DC voltage into AC voltages and then output the resultant AC voltages;

a drive voltage command calculator to calculate first multi-phase drive voltage commands and second multi-phase drive voltage commands, which cause the first multi-phase inverter and the second multi-phase inverter to drive a load based on an external control command;

a first average voltage adjuster to output, as first multi-phase voltage commands, values obtained by adjusting the first multi-phase drive voltage commands with use of a first offset voltage, to thereby control the first multi-phase inverter;

a second average voltage adjuster to output, as second multi-phase voltage commands, values obtained by adjusting the second multi-phase drive voltage commands with use of a second offset voltage, to thereby control the second multi-phase inverter; and a voltage adjustment calculator to, when the DC voltage of the DC power supply is represented by Vdc, a frequency of a PWM signal of each of the first multi-phase inverter and the second multi-phase inverter is represented by fc, and a lower limit frequency defined by noise regulation to which the power conversion device is required to conform is represented by fr, control the first average voltage adjuster and the second average voltage adjuster so that an absolute value of a differential voltage being a difference between: a first average voltage, which is an average value of the first multi-phase voltage commands of respective phases as command values for the AC voltages to be output from the first multi-phase inverter; and a second average voltage, which is an average value of the second multi-phase voltage commands of respective phases as command values for the AC voltages to be output from the second multi-phase inverter, is a value derived from Expression (3):

$$k2 \cdot Vdc/n[V] \tag{3}$$

where the value of n is an integer equal to or more than fr/fc obtained by dividing fr by fc, and k2 represents an odd number equal to or more than one.

6. The power conversion device according to claim 5, wherein the voltage adjustment controller, when an upper limit frequency defined by the noise regulation to which the power conversion device is required to conform is represented by fh, sets the value of n derived from Expression (3) to an integer equal to or less than fh/fc obtained by dividing fh by fc.

7. The power conversion device according to claim 6, wherein the voltage adjustment controller controls the first average voltage adjuster and the second average voltage adjuster so as to change the absolute value of the differential voltage by changing the value n at a regular interval that is a positive integral multiple of a half cycle of the PWM signal, as the differential voltage.

8. A power conversion device, comprising:
a first multi-phase inverter and a second multi-phase inverter to receive a DC voltage output from a DC power supply, and execute power conversion to convert the DC voltage into AC voltages and then output the resultant AC voltages;

a drive voltage command calculator to calculate first multi-phase drive voltage commands and second multi-phase drive voltage commands, which cause the first multi-phase inverter and the second multi-phase inverter to drive a load based on an external control command;

a first average voltage adjuster to output, as first multi-phase voltage commands, values obtained by adjusting the first multi-phase drive voltage commands with use of a first offset voltage, to thereby control the first multi-phase inverter;

a second average voltage adjuster to output, as second multi-phase voltage commands, values obtained by adjusting the second multi-phase drive voltage commands with use of a second offset voltage, to thereby control the second multi-phase inverter; and a voltage adjustment controller to, when the DC voltage of the DC power supply is represented by Vdc, a PWM signal of each of the first multi-phase inverter and the second multi-phase inverter has a frequency of 20 kHz, and an upper limit frequency defined by noise regulation to which the power conversion device is required to conform, is 150 kHz, control the first average voltage adjuster and the second average voltage adjuster so that a differential voltage being a difference between: a first average voltage, which is an average value of the first multi-phase voltage commands of respective phases as command values for the AC voltages to be output from the first multi-phase inverter; and a second average voltage, which is an average value of the second multi-phase voltage commands of respective phases as command values for the AC voltages to be output from the second multi-phase inverter, is changed in a range including a value derived from Expression (4):

$$Vdc/8[V] \tag{4}$$

at a regular interval that is a positive integral multiple.

9. The power conversion device according to claim 8, wherein the voltage adjustment controller sets the differential voltage in a range including a value derived from Expression (5):

$$-Vdc/8[V] \tag{5}$$

10. The power conversion device according to claim 9, wherein the voltage adjustment controller sets the differential voltage in a range including a value derived from at least one of Expression (6) or (7):

$$Vdc/12[V] \tag{6}$$

$$-Vdc/12[V] \tag{7}$$

* * * * *